United States Patent
Henry et al.

(10) Patent No.: US 6,215,422 B1
(45) Date of Patent: Apr. 10, 2001

(54) DIGITAL SIGNAL HUFFMAN CODING WITH DIVISION OF FREQUENCY SUB-BANDS

(75) Inventors: Félix Henry, Rennes; Isabelle Amonou, Thorigne-Fouillard; Claude Dierieck, Cesson-Sevigne, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/129,913

(22) Filed: Aug. 6, 1998

(30) Foreign Application Priority Data

Aug. 29, 1997 (FR) .................................................. 97 10804
Aug. 29, 1997 (FR) .................................................. 97 10805
Aug. 29, 1997 (FR) .................................................. 97 10806
Aug. 29, 1997 (FR) .................................................. 97 10807

(51) Int. Cl.[7] ............................. H03M 7/34; H03M 7/40; G06K 9/36; G06K 9/46
(52) U.S. Cl. ............................. 341/51; 341/65; 382/239; 382/246
(58) Field of Search ................................. 341/67, 51, 65; 382/246, 240, 239, 248; 709/247; 375/240

(56) References Cited

U.S. PATENT DOCUMENTS

| | | |
|---|---|---|
| 5,063,444 | 11/1991 | Knauer et al. . |
| 5,148,497 | 9/1992 | Pentland et al. . |
| 5,481,308 | 1/1996 | Hartung et al. . |
| 5,757,973 * | 5/1998 | Wilkinson et al. .................. 382/246 |

FOREIGN PATENT DOCUMENTS

| | | |
|---|---|---|
| 0 734 164 A2 | 9/1996 | (EP) . |
| 0 734 164 A3 | 4/1998 | (EP) . |
| 08 214 169 | 8/1996 | (JP) . |
| 2 730 594 | 8/1996 | (FR) . |
| 96 02895 | 2/1996 | (WO) . |
| 97 16021 | 5/1997 | (WO) . |

OTHER PUBLICATIONS

Reusens et al., "New Results In Subband/Wavelet Image Coding," Proc. Int. Conf. Comm (ICC), vol. 1, May 23, 1993, pp.381–385, IEEE.

Lee et al., "Classified Vector Quantizer Technique For Image Coding Employing The Linear Phase Paraunitary M–Band Filter Bank," Optical Engineering, vol. 35, No. 8, Aug. 1996, pp/ 2266–2275.

Labriki et al., "Codage D'images Transformee En Ondelattes," Coll. Traitment Sig. Et Images,Sep. 16, 1991, vol. 2. No. 13, pp. 897–900.

Senoo et al., "Vector Quantization For Entropy Encoding Of Image Subbands," IEEE Trans, Image Proc., vol. 1, No. 4, Oct. 1, 1992, pp. 526–533.

Rinaldo et al., "Hybrid Vector Quantization For Multiresolution Image Coding," IEEE Trans. Image Proc., vol. 6, No. 5, 1997, pp. 753–758.

(List continued on next page.)

*Primary Examiner*—Patrick Wamsley
(74) *Attorney, Agent, or Firm*—Fitzpatrick, Cella, Harper & Scinto

(57) ABSTRACT

The invention proposes a digital signal coding method including a step of analysing (E1) the digital signal (IM) into a plurality of frequency sub-band signals distributed according to at least two different frequency bands, at least one first sub-band signal having a lower frequency and at least one second sub-band signal having a higher frequency, characterised in that it includes, for each second sub-band signal, the steps of:

dividing (E4) the second sub-band signals into blocks ($B_{i,n}$), selecting (E9) blocks to be coded by setting to a predetermined value, according to a selection criterion, coding the blocks selected by setting to the predetermined value.

8 Claims, 23 Drawing Sheets

OTHER PUBLICATIONS

Huh et al., "Classified Wavelet Transform Coding Of Images Using Vector Quantization", Proc. Of the SPIE, vol. 2308, Sep. 25, 1994, pp. 207–217.

Xiong et al., "Space–Frequency Quantization For Wavelet Image Coding", IEEE Trans. On Image Proc., vol. 6, No. 5, 1997, pp. 677–693.

Crouse et al., "Joint Thresholding And Quantizer Selection For Decoder–Compatible Baseline JPEG", Proc. Of the Int'l Conf. On Acoustics, Speech, and Signal Proc., Image and Multi–Dimensional Signal Processing/Signal Processing Applications Development, vol. 4. No. Conf. 20, IEEE, May 9, 1995, pp. 2331–2334.

G. Davis, "Adaptive Self–Quantization of Wavelet Subtrees: A Wavelet–Based Theory of Fractal Image Compression", Wavelet Applications In Signal And Image Processing III, Proc. Of the SPIE, 1995, pp. 294–306.

Barthel et al., "Improved Fractal Image Coding", Proc. Of The Picture Coding Symposium, Mar. 17, 1993, pp. 1.5–A –B.

Rinaldo et al., "An improved Wavelet–Fractal Coder", Int'l Symposium on Circuits and Systems, Comm. And Visual Signal Proc., IEEE vol. 3, May 30, 1994, pp. 113–116.

Zhang et al., "Speeding Up Fractal; Image Encoding By Wavelet–Based Block Classification", Electronics Letters, vol. 32, No. 23, Nov. 7, 1996, pp. 2140–2141.

Joshi et al., "Optimum Classification In Subband Coding of Images", Proc. Of the Int'l. Conf. On Image Proc., vol. 2, no. conf. 1, IEEE, Nov. 13, 1994, pp. 883–887.

* cited by examiner

DIGITAL SIGNAL HUFFMAN CODING WITH DIVISION OF FREQUENCY SUB-BANDS

The present invention concerns in general digital signal coding and to that end proposes a device and method for coding a digital signal by breaking the signal down into frequency sub-band signals and coding the coefficients resulting from the breakdown into sub-band signals. It also concerns a decoding method and device corresponding to the coding method and device. The present invention also proposes a device and a method for coding a digital signal which offers an adaptive allocation of transmission rate to the signal to be coded. It also concerns a decoding method and device corresponding to the coding method and device.

The aim of the coding is to compress the signal, which makes it possible to transmit, or respectively store, the digital signal while reducing the transmission time, or the transmission rate, or respectively reducing the memory space used.

The invention belongs to the field of digital signal compression with loss.

Breaking a signal down into frequency sub-band signals before compressing it is known. The breaking down consists of creating, from the signal, a set of sub-band signals which each contain a limited range of frequencies. The sub-band signals may be of different resolutions, the resolution of a sub-band signal being the number of samples per unit length used to represent that sub-band signal. In the case of a digital image signal, a frequency sub-band signal of that signal may itself be considered as an image, that is to say a bidimensional table of digital values.

It should be noted that breaking a signal down into frequency sub-band signals does not in itself create any compression, but makes it possible to decorrelate the signal so as to eliminate redundancy from it prior to the compression proper. The sub-band signals are thus coded more efficiently than the original signal.

A first known method of coding a digital signal, in this case a digital image, has three main steps. The image is first of all broken down by a transformation into frequency sub-band signals, in order to form frequency sub-band signals according to a number of resolutions. The frequency sub-band signals are next divided into blocks. Each block can be coded by two different coding modes, for example by inter-resolution prediction, or by residual block coding, if coding of the block under consideration by prediction does not give a satisfactory result.

An additional information is added to the data for coding each block, to indicate which coding mode was used to code the block under consideration.

This method has good coding accuracy, since two coding modes can be used for each block, according to a quality criterion. The coding error is therefore smaller than if a single coding mode is used. However, it is necessary to add supplementary information to indicate which coding mode was used to code each block. This supplementary information decreases the compression ratio.

A second known method of coding a digital signal, in this case a digital image, includes three main steps. The image is first of all broken down by means of a transformation into frequency sub-band signals, and then a scalar quantization of the coefficients thus obtained is performed. The quantified indices are finally coded by means of an entropic coding without loss.

This method affords a high compression ratio for the signal. However, the ratio between the compression ratio and the coding error is open to improvement.

A third known method of coding a digital signal, in this case a digital image, uses the similarity between blocks of different sub-band signals of a multi-resolution breakdown of the image.

This method makes it possible to obtain a good visual quality of the restored image and limited distortion. However, the ratio between the compression ratio and the coding error is open to improvement.

A fourth known method of coding a digital signal, in this case a digital image, divides the signal into parts and allocates a coding mode to each part in an optimum fashion, which makes it possible to adapt the transmission rate in an optimum manner. Hereinafter, it is considered that the coding of a digital signal includes two main operations: the quantification of the signal, for example a vectorial quantification, which supplies a series of symbols, and then an entropic coding of these symbols, for example a Huffman coding, which supplies a binary series.

The coding modes are composed of a quantification mode, and an entropic coding mode. The known method consists of testing all the combinations of quantification mode and entropic coding mode, for each part of the signal, and then selecting the best combination, according to a criterion, for each part of the signal.

This method entails numerous calculations, the quantity of which increases with the number of quantification modes, entropic coding modes and parts of the signal. In practice, it is necessary to reduce one of these numbers, for example the number of parts of the signal, in order to reduce the calculation time. This reduction is achieved to the detriment of the adaptability of the transmission rate to the signal to be coded. The ratio of compression to distortion is consequently open to improvement.

The present invention aims to remedy the drawbacks of the prior art by providing a device and method for compressing a digital signal which offers a high ratio of compression to distortion.

To that end, the invention firstly proposes a digital signal coding method having a step of analysing the digital signal into a plurality of frequency sub-band signals distributed according to at least two different frequency bands, at least one first sub-band signal having a lower frequency and at least one second sub-band signal having a higher frequency, characterised in that it has, for each second sub-band signal, the steps of:

dividing the second sub-band signal into blocks,
selecting a coding mode for each block to be coded from amongst a predetermined set of coding modes, according to a selection criterion,
associating an indicator with each block to be coded, the value of which is a function of the coding mode selected for the block under consideration,
grouping the indicators into indicator words, according to a grouping criterion, and
entropic coding of the indicator words.

Correlatively, the invention proposes a digital signal coding device having means of analysing the digital signal into a plurality of frequency sub-band signals distributed according to at least two different frequency bands, at least one first sub-band signal having a lower frequency and at least one second sub-band signal having a higher frequency, characterised in that it has:

means of dividing each second sub-band signal into blocks,
means of selecting a coding mode for each block to be coded from amongst a predetermined set of coding modes, according to a selection criterion, means of associating an indicator with each block to be coded, the value of which is a function of the coding mode selected for the block under consideration, means of grouping the indicators into indicator words, according to a grouping criterion, and means of entropic coding of the indicator words.

The digital signal coding device and method according to the invention have a high ratio of compression ratio over coding error. This is because the use of a number of coding modes makes it possible to choose the most appropriate coding mode for each block, which reduces the overall coding error.

An indicator for each block is necessary for the decoding in order to indicate which coding mode was used. There are therefore as many indicators as blocks, which reduces the compression ratio. Grouping of the indicators into words, the said words then being coded, makes it possible to limit the compression ratio reduction.

Thus the invention has overall a ratio of compression ratio over coding error which is high.

According to a preferred characteristic, the grouping criterion consists of grouping together indicators of blocks selected from sub-band signals in order to correspond to the same part of the digital signal.

This type of grouping makes use of the correlation which exists between the different sub-band signals of the digital signal, by virtue of which the indicator words are then coded with a higher compression ratio.

According to another preferred characteristic, for each block, the selection step consists of the coding of the block by each coding mode, comparison of the coding modes according to the selection criterion and selection of the coding mode which satisfies the selection criterion. The selection is thus based on a comparison of the coding modes, for each block to be coded. Allocation of the most appropriate coding mode to each block is carried out simply and reliably.

According to a preferred characteristic of the invention, for each block to be coded, the coding mode selected is the one which minimises a weighted sum of the transmission rate and the coding error of the block under consideration. This criterion makes it possible to select, for each block to be coded, the most appropriate coding mode.

According to another preferred characteristic, the entropic coding of the indicator words is a Huffman coding. This coding mode gives satisfactory results, both in compression ratio and ease of implementation.

The said at least one first sub-band signal is coded according to a third coding mode, or alternately it is coded in an identical manner to the said at least one second sub-band signal. Depending on the applications and the degree of complexity of implementation of the invention, it can be chosen to code the first sub-band signal separately, according to a coding mode specific to it, since in general it contains a lot of information, or it can be coded like the detail sub-band signals, which simplifies the implementation.

The invention also concerns a method of decoding a coded digital signal, the said signal consisting of coded representations of blocks formed in frequency sub-band signals of the original signal, each coded representation being associated with an indicator representing a coding mode selected from amongst a predetermined set of coding modes, the indicators being grouped in indicator words which are coded, characterised in that it includes the steps of:

decoding the indicator words, then for each block, reading the value of the indicator, decoding the respective coded representation, according to a decoding mode corresponding to one of the coding modes, according to the value of the indicator.

Correlatively, the invention proposes a device for decoding a coded digital signal, the said signal consisting of coded representations of blocks formed in frequency sub-band signals of the original signal, each coded representation being associated with an indicator representing a coding mode selected from amongst a predetermined set of coding modes, the indicators being grouped in indicator words which are coded, characterised in that it has:

means of decoding the indicator words, means of reading the value of the indicator of each block, means of decoding each coded representation of the blocks according to a decoding mode corresponding to one of the coding modes, according to the value of the indicator of the block under consideration.

The decoding method and device make it possible to reconstruct the signal, for example in receiving equipment corresponding to sending equipment in which the signal was coded according to the invention.

The invention secondly proposes a method of coding a digital signal, including the analysis of the signal for separating the pertinent information and the non-pertinent information, and then the coding of the non-pertinent information according to a first coding mode which offers a high compression ratio, and coding of the pertinent information according to a second coding mode which limits distortion.

To this end, the invention proposes a digital signal coding method including a step of analysing the digital signal into a plurality of frequency sub-band signals distributed in at least two different frequency bands, at least one first sub-band signal having a lower frequency and at least one second sub-band signal having a higher frequency, characterised in that it includes, for each second sub-band signal, the steps of:

dividing the second sub-band signal into blocks, selecting blocks which are to be coded by setting to a predetermined value, according to a selection criterion, coding the blocks selected at the previous step, by setting to the predetermined value.

Correlatively, the invention proposes a digital signal coding device having means of analysing the digital signal into a plurality of frequency sub-band signals distributed according to at least two different frequency bands, at least one first sub-band signal having a lower frequency and at least one second sub-band signal having a higher frequency, characterised in that it has:

means of dividing each second sub-band signal into blocks, means of selecting blocks which are to be coded by setting to a predetermined value, in each second sub-band signal, according to a selection criterion, means of coding the selected blocks by setting to the predetermined value.

The method and device according to the invention give a high ratio of compression to distortion.

Breaking down into frequency sub-band signals separates the pertinent information from the non-pertinent information. The non-pertinent information is then coded by setting to the predetermined value, which requires a nil transmission rate. Compression of the non-pertinent information is maximum. It is thus possible to give a higher transmission rate to the pertinent information, which is thus coded more precisely. Distortion of the pertinent information is minimum.

Overall, the ratio of compression to distortion obtained is high.

The predetermined value is for example nil, so that, on decoding, blocks are constructed for which all the coefficients are nil.

According to a preferred characteristic, for each of the blocks, the selection step includes the coding of the block by setting to the predetermined value and by a second coding mode, the comparison of the two coding modes according to the selection criterion and the selection of the coding by setting to the predetermined value if the block coded by setting to the predetermined value satisfies the selection criterion. The selection is thus based on a comparison of the two coding modes, for each of the blocks to be coded. Allocating the coding mode by setting to the predetermined value is achieved simply and reliably.

The blocks which are not selected at the selection step are coded by the second coding mode. This second mode is preferably a scalar quantization of the coefficients of the block. The second coding mode is adapted to code in a precise fashion the blocks which contain the pertinent information. The second coding mode can itself include a plurality of coding modes, a block being coded by one of the coding modes selected so as to be as suitable as possible for the block in question, which makes it possible to code the pertinent information even more finely.

According to a preferred characteristic of the invention, the selection criterion minimises a weighted sum of the transmission rate and of the coding error caused by the coding of the block under consideration. This criterion makes it possible to select the blocks to be coded with a low transmission rate on the one hand and the blocks to be coded with precision on the other hand.

According to a preferred characteristic of the invention, an indicator is associated with each block in order to indicate whether or not the block under consideration is coded by setting to the predetermined value. This indicator forms part of the coded form of the block and is used at decoding in order to determine which coding mode has been used for the block under consideration.

In another aspect of the invention, the said at least one first sub-band signal is coded according to a third coding mode. This is because the lowest frequency sub-band signal generally contains a great deal of information, and it is preferable not to seek to code parts thereof by setting to the predetermined value, since this could introduce significant errors.

The coding device has means adapted to implement the above characteristics.

The invention also concerns a method of decoding a coded digital signal, the said signal including coded representations of blocks formed in frequency sub-band signals of the original signal, each coded representation including at least one indicator representing a first or a second coding mode, characterised in that it includes the steps of:
  reading the value of the indicator,
  decoding the coded representations according to a first or a second decoding mode, corresponding respectively to the first or to the second coding mode, according to the value of the indicator.

Correlatively, the invention concerns a device for decoding a coded digital signal, the said signal including coded representations of blocks formed in frequency sub-band signals of the original signal, each coded representation including at least one indicator representing a first or a second coding mode, characterised in that it includes:
  means of reading the value of the indicator,
  means of decoding the coded representations, according to a first or a second decoding mode corresponding respectively to the first or to the second coding mode, according to the value of the indicator.

The decoding method and device make it possible to reconstruct the signal, for example in a receiving apparatus corresponding to a sending apparatus in which the signal was coded according to the invention.

Thirdly, the invention proposes a digital signal coding method including a step of analysing the digital signal into a plurality of frequency sub-band signals distributed according to at least two different resolutions, at least one first sub-band signal having a lower resolution and at least one second sub-band signal having a higher resolution,
  characterised in that it includes, for each second sub-band signal, the steps of:
  dividing the second sub-band signal into target blocks,
  selecting, for each of the target blocks, a predetermined number of source blocks from a first sub-band signal, a source block being selected if its energy is greater than a predetermined threshold,
  allocating, to each of the source blocks selected at the previous step, one transformation from a predetermined set of transformations, according to an allocation criterion,
  selecting, for each of the target blocks, one of the selected source blocks, associated with the transformation allocated to it at the previous step, according to a selection criterion.

Correlatively, the invention proposes a digital signal coding device having means of analysing the digital signal into a plurality of frequency sub-band signals distributed according to at least two different frequency bands, at least one first sub-band signal having a lower frequency and at least one second sub-band signal having a higher frequency, characterised in that it has:
  means of dividing each second sub-band signal into blocks,
  first means of selecting, for each of the target blocks, a predetermined number of source blocks from a first sub-band signal, a source block being selected if its energy is greater than a predetermined threshold,
  means of allocating, to each of the source blocks selected by the first selection means, one transformation from a predetermined set of transformations, according to an allocation criterion,
  second means of selecting, for each of the target blocks, one of the selected source blocks, associated with the transformation allocated to it by the allocation means, according to a selection criterion.

The method and device according to the invention make it possible to obtain a high ratio of compression to distortion.

This is because the invention first of all makes it possible to determine, for each target block to be coded, source blocks having a sufficiently high energy to be able to code the target block with precision.

The invention then makes it possible to determine, for each "candidate" source block, a transformation such that the source block transformed by this transformation is a good approximation of the target block to be coded.

The invention lastly makes it possible to determine, amongst all the pairs of "candidate" source blocks and transformations, which is the one which most precisely codes the target block.

The coding error, or distortion, is therefore low.

The coding data of a target block are therefore the ranking of the source block and the index of the transformation which are used for coding it. These coding data require only a low transmission rate. The resulting compression of the coding is therefore high.

Overall, the invention improves the search for the source block and provides a compact code for describing the coded blocks.

According to a preferred characteristic, at the step of selecting the predetermined number of source blocks, a first source block is considered, the said first source block having a position, in its frequency sub-band signal, identical to the position of the target block, in its frequency sub-band signal, except for the resolution factor.

The inventors have shown experimentally that this first source block is generally a good "candidate" for coding the target block.

According to another preferred characteristic, at the step of selecting the predetermined number of source blocks, the source blocks are considered in an order such that their distance with respect to the first source block is substantially increasing. For example, the source blocks are considered in an order such that they cover a spiral line centred on the first source block.

The inventors have also shown that the best source blocks are in the vicinity of the first source block, and generally very close to it. It is therefore advantageous to seek the source blocks by increasing distance with respect to the first source block.

According to a preferred characteristic, the allocation criterion consists of selecting, from the set of transformations, the transformation for which a distance between the target block and the block resulting from the application of the said transformation to the relevant source block is at a minimum.

Advantageously, the distance is the root mean square error between the coefficients of the target block and the block resulting from the application of the said transformation to the source block under consideration.

This criterion is simple and rapid to implement, whilst giving very good results.

According to another preferred characteristic, the selection criterion consists of selecting, from amongst the selected source blocks, the source block and the transformation allocated to it for which a distance between the target block and the block resulting from the application of the said transformation to the relevant source block is at a minimum.

This criterion has the same advantages as the preceding one.

The invention also concerns a method of decoding a coded digital signal, the said signal including coded representations of blocks formed in a plurality of frequency sub-band signals of the original signal, distributed in at least two different resolutions, at least one first sub-band signal having a lower resolution and at least one second sub-band signal having a higher resolution, each coded representation having at least one source block ranking and one index representing a transformation of a predetermined set of transformations, characterised in that it includes, for each block of each second sub-band signal, the steps of:

reading the value of the source block ranking and of the index, selecting source blocks, at least equal in number to the value of the ranking previously read, in a sub-band signal of lower resolution, a source block being selected if its energy is greater than a predetermined threshold, seeking the source block whose ranking has the value previously read, amongst the selected source blocks, applying the transformation represented by the index to the source block whose ranking has the previously read value.

Correlatively, the invention proposes a device for decoding a coded digital signal, the said signal including coded representations of blocks formed in a plurality of frequency sub-band signals of the original signal, distributed in at least two different resolutions, at least one first sub-band signal having a lower resolution and at least one second sub-band signal having a higher resolution, each coded representation having at least one source block ranking and one index representing a transformation of a predetermined set of transformations, characterised in that it includes, for each block of each second sub-band signal:

means of reading the value of the source block ranking and of the index, means of selecting source blocks, at least equal in number to the previously read ranking value, in a sub-band signal of lower resolution, a source block being selected if its energy is greater than a predetermined threshold, means of seeking the source block whose ranking has the previously read value, amongst the selected source blocks, means of applying the transformation represented by the index to the source block whose ranking has the previously read value.

The decoding method and device make it possible to reconstruct the signal, for example in receiving equipment corresponding to sending equipment in which the signal was coded according to the invention.

Finally, the invention proposes a digital signal coding method, characterised in that it includes the steps of:

dividing the signal into blocks, allocating a quantification mode and an entropic coding mode to each of the blocks, according to an allocation criterion, from amongst a predetermined set of quantification modes and a predetermined set of entropic coding modes, quantifying each of the blocks of the signal by means of the quantification mode which has been allocated to it;

forming sub-sets of blocks, each sub-set containing blocks to which the same quantification mode has been allocated, selecting, for each sub-set formed, an entropic coding mode according to a selection criterion, reiterating the steps of allocation, quantification, formation and selection, so as to satisfy a convergence criterion.

Correlatively, the invention proposes a digital signal coding device, characterised in that it has:

means of dividing the digital signal into blocks, means of allocating a quantification mode and an entropic coding mode to each of the blocks, according to an allocation criterion, from amongst a predetermined set of quantification modes and a predetermined set of entropic coding means, means of quantifying each of the blocks of the signal by means of the quantification mode which has been allocated to it, means of forming sub-sets of blocks, each sub-set containing blocks to which the same quantification mode has been allocated, means of selecting, for each sub-set formed, an entropic coding mode according to a selection criterion.

The method and device according to the invention make it possible to obtain a high ratio of compression to distortion.

In fact the invention makes it possible to allocate a quantification mode and an entropic coding mode to each of the blocks of the signal which are well suited to coding this block and consequently which code it with precision.

According to a preferred characteristic, the method also includes an initialisation step at which each of the quantification modes is respectively associated with an entropic coding mode, according to the digital signal, so as to satisfy an association criterion.

This initialisation step makes it possible to arrive at convergence with a reduced number of iterations.

According to another preferred characteristic, the association criterion consists of seeking the minimum, for each of the quantification modes, of the transmission rates of the signal quantified by means of the quantification mode under consideration, and then coded by means of each of the entropic coding modes.

The purpose of this criterion is to obtain finally a good compression ratio for the signal.

According to a preferred characteristic, the allocation criterion minimises a weighted sum of the transmission rate and of the coding error caused by the quantification and entropic coding of the block under consideration.

This criterion helps to obtain a good ratio of compression to distortion with the invention.

According to a preferred characteristic of the invention, the selection criterion consists, for a given sub-set, of seeking the minimum of the transmission rates of the sub-set quantified and then coded by means of each of the entropic coding modes.

The purpose of this criterion is to obtain finally a good compression ratio for the signal.

According to a preferred characteristic of the invention, the convergence criterion is satisfied when the same sub-sets of blocks have been formed with two successive iterations of the formation step.

This convergence criterion is simple to implement, since it suffices to store to memory the sub-sets obtained at each iteration and comparing them with those stored at the previous iteration.

According to another preferred characteristic of the invention, an indicator is associated with each block in order to indicate which quantification mode and which entropic coding mode are obtained after convergence.

This indicator is used at the time of decoding.

The coding device has means adapted to implement the above characteristics.

The invention also concerns a method of decoding a coded digital signal, the said signal having coded representations of blocks formed in the original signal, each coded representation having at least one indicator representing a quantification mode and an entropic coding mode, characterised in that it includes the steps of:

reading the value of the indicator, decoding and dequantifying the coded representations, according to the value of the respective indicator.

Correlatively, the invention concerns a device for decoding a coded digital signal, the said signal having coded representations of blocks formed in the original signal, each coded representation having at least one indicator representing a quantification mode and an entropic coding mode, characterised in that it includes:

means of reading the value of the indicator, means of decoding and dequantifying the coded representations, according to the value of the indicator.

The decoding method and device make it possible to reconstruct the signal, for example in a receiving apparatus corresponding to a sending apparatus in which the signal was coded according to the invention.

The present invention also concerns a digital signal processing equipment, a communication device, such as computer, printer or facsimile apparatus, including the preceding coding and/or decoding devices.

The present invention also concerns a storage medium, such as a floppy disk or a CD-ROM.

The advantages of these equipement and storage medium are similar to those previously described.

The characteristics and advantages of the present invention will emerge more clearly from a reading of a preferred embodiment illustrated by the accompanying drawings, in which.

Figure 1:
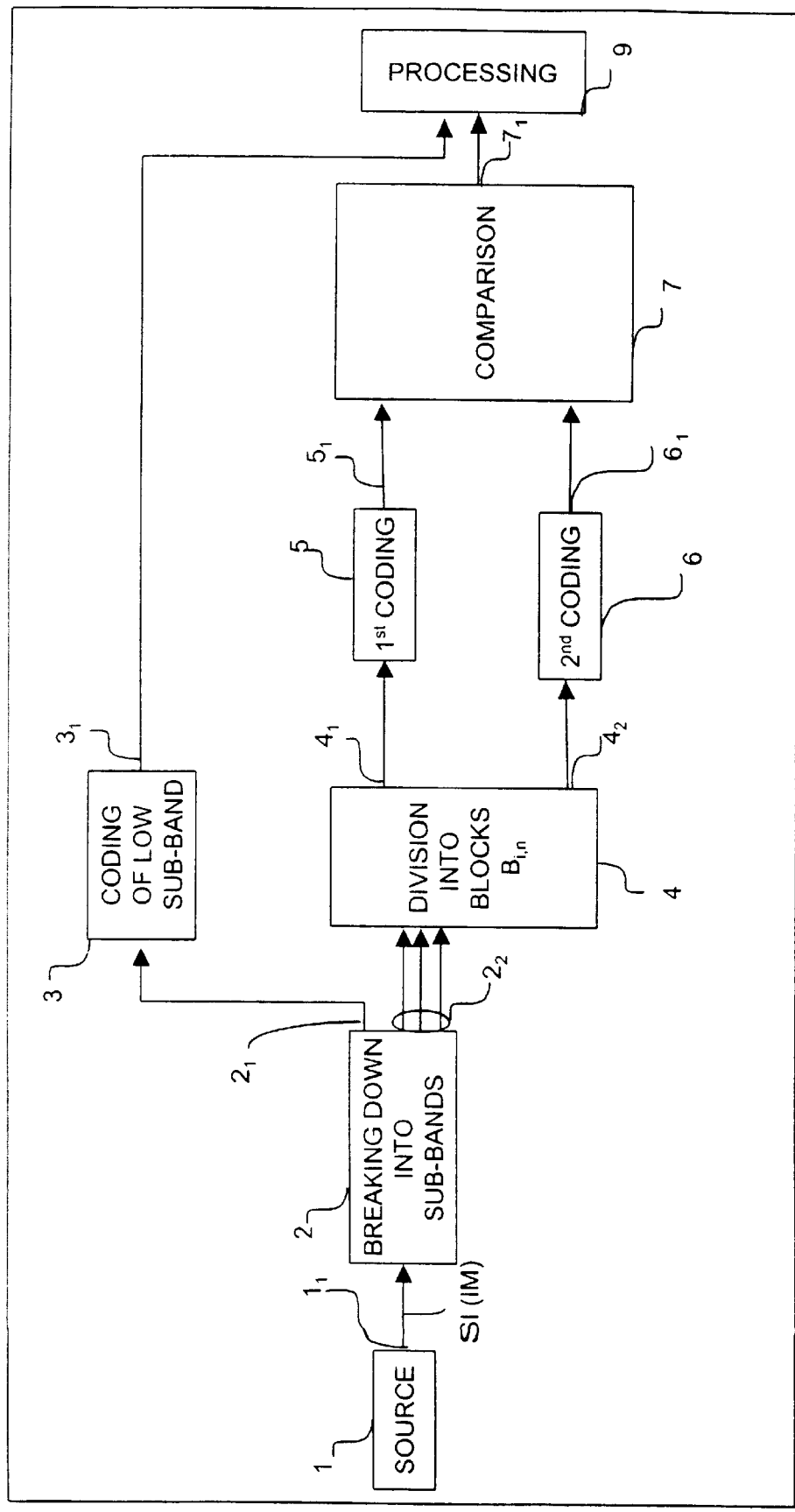
FIG. 1 is a block diagram of a first embodiment of a digital signal coding device according to the invention.

According to the four embodments chosen and depicted in FIGS. 1 to 4, a coding device according to the invention is designed to code a digital signal for the purpose of compressing it. The coding device is integrated into an apparatus 100, 100a, 100b, 100c, which is for example a digital camera, or a digital video camera, or a data base management system, or a computer.

The digital signal to be compressed SI is in these particular embodiments a series of digital samples representing an image.

The device has a signal source 1, 1a, 1b, 1c, in this case an image signal. In general terms, the signal source either contains the digital signal, and is for example a memory, a hard disk or a CD-ROM, or converts an analogue signal into a digital signal, and is for example an analogue video camera associated with an analogue-to-digital converter. An output $1_1$, $1a_1$, $1b_1$, $1c_1$ of the signal source is connected to an analysis circuit, or circuit for breaking down into sub-band signals 2, 2a, 2b, 2c. The circuit 2, 2a, 2b has a first output $2_1$, $2a_1$, $2b_1$ connected to a coding circuit 3, 3a, 3b.

According to the first embodiment depicted in FIG. 1, second outputs $2_2$ of the breakdown circuit 2 are connected to a circuit for dividing into blocks 4. The circuit 4 has first outputs $4_1$ connected to a first coding circuit 5 and second outputs $4_2$ connected to a second coding circuit 6.

An output $5_1$ of the circuit 5 and an output $6_1$ of the circuit 6 are connected to a comparison circuit 7, an output $7_1$ of which constitutes the output of the coding device according to the invention. The output $7_1$ is connected to a processing circuit 9, which is for example a transmission circuit, or a memory. An output $3_1$ of the coding circuit 3 is also connected to the processing circuit 9.

Figure 2:
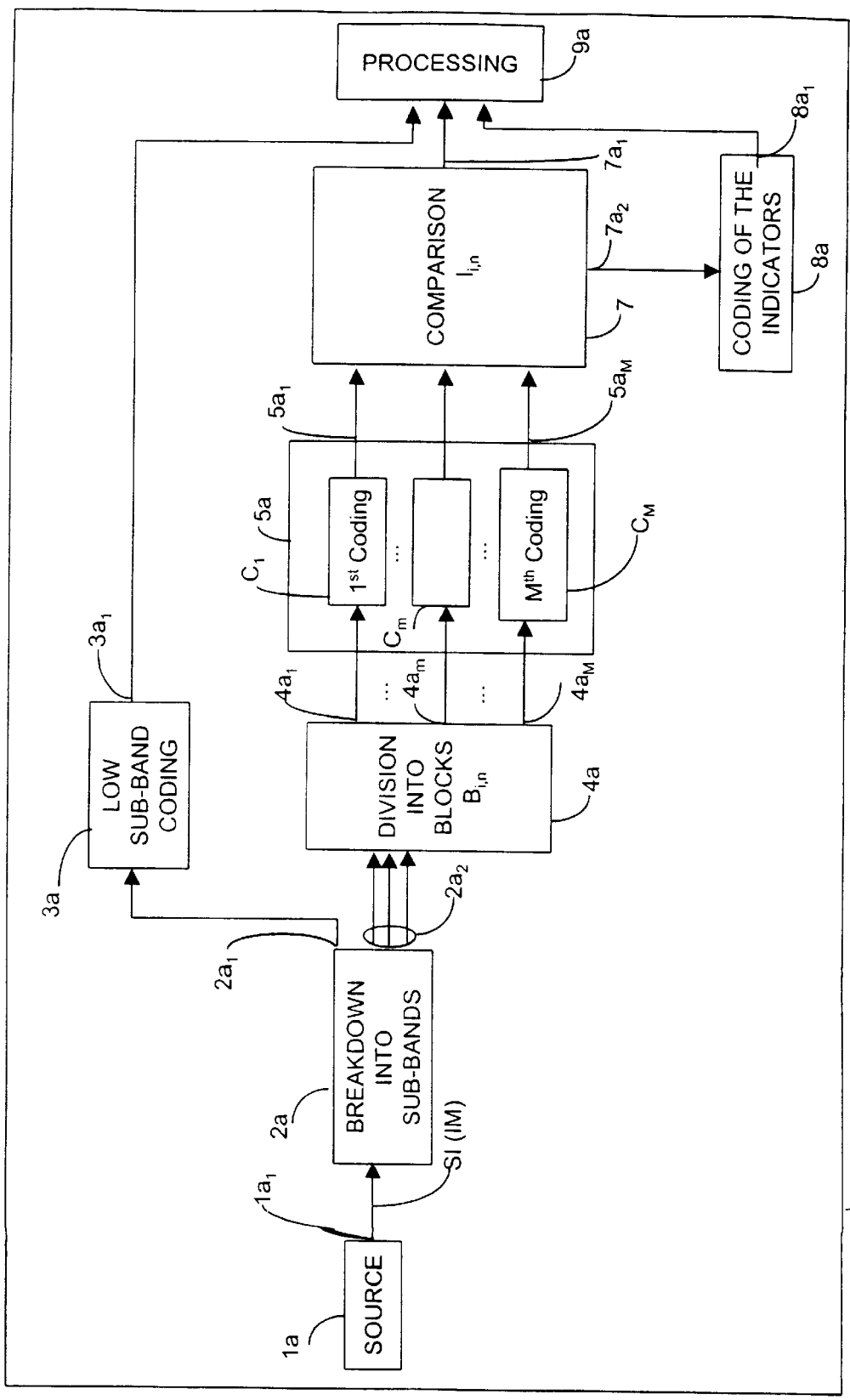
FIG. 2 is a block diagram of a second embodiment of a digital signal coding device according to the invention.

According to the second embodiment depicted in FIG. 2, second outputs $2a_2$ of the breakdown circuit 2a are connected to a circuit for division into blocks 4a. The circuit 4a has outputs $4a_1$ to $4a_M$ connected to a coding block 5a, where M is an integer at least equal to 2. The coding block 5a has coding circuits $C_1$ to $C_M$. An output $4a_m$ is connected to a respective coding circuit $C_m$, for m between 1 and M.

Each of the coding circuits $C_1$ to $C_M$ of the coding block 5a has a respective output $5a_1$ to $5a_M$ connected to a comparison circuit 7a. A first output $7a_1$ of the comparison circuit 7a is connected to a processing circuit 9a, which is for example a transmission circuit, or a memory. A second output $7a_2$ of the comparison circuit 7a is connected to a coding circuit 8a, an output $8a_1$ of which is connected to the processing circuit 9a.

An output $3a_1$ of the coding circuit 3a is also connected to the processing circuit 9a.

Figure 3:
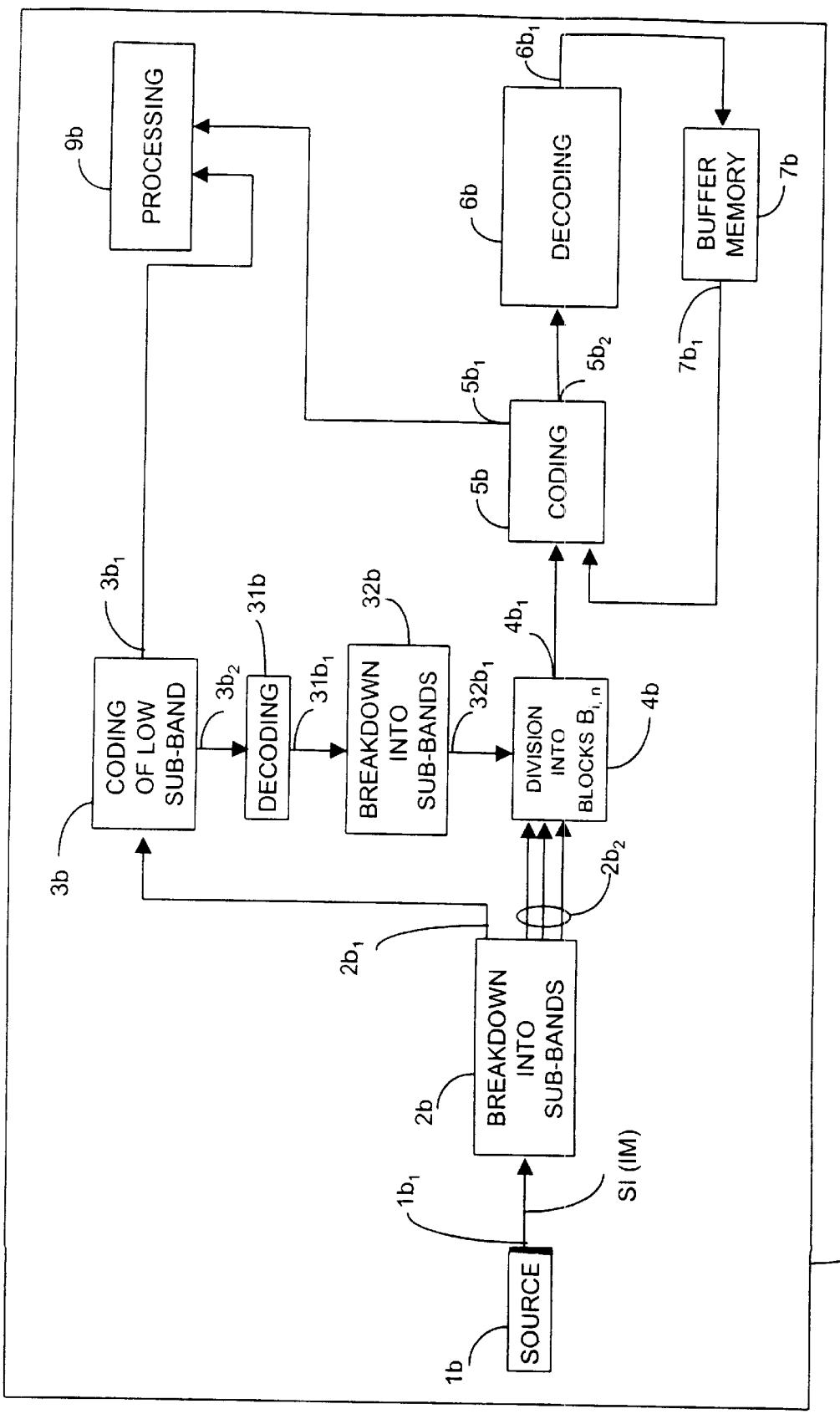
FIG. 3 is a block diagram of a third embodiment of a digital signal coding device according to the invention.

According to the third embodiment depicted in FIG. 3, the coding circuit 3b has a first output $3b_1$ connected to a processing circuit 9b, and a second output $3b_2$ connected to a decoding circuit 31b. The latter has an output $31b_1$ connected to a second circuit 32b for breaking down into sub-band signals, a output $32b_1$ of which is connected to a circuit for dividing into blocks 4b.

Second outputs $2b_2$ of the breakdown circuit 2b are connected to the circuit for dividing into blocks 4b. The circuit 4b has an output $4b_1$ connected to a coding circuit 5b.

A first output $5b_1$ of the circuit 5b is connected to the processing circuit 9b, which is for example a transmission circuit, or a memory. A second output $5b_2$ of the circuit 5b is connected to a decoding circuit 6b, an output $6b_1$ of which is connected to a buffer memory 7b.

An output $7b_1$ of the buffer memory 7b is connected to the coding circuit 5b.

Figure 4:
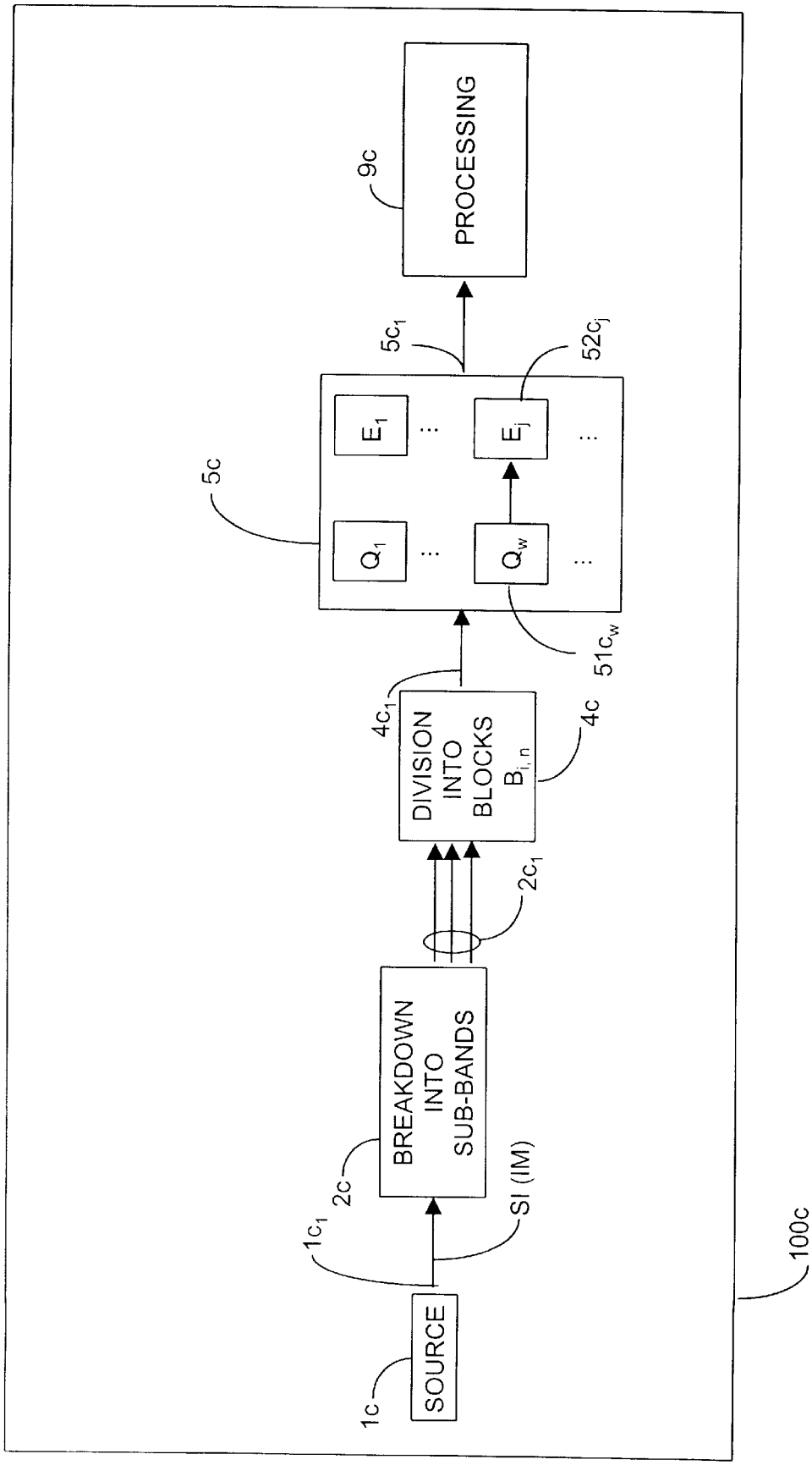
FIG. 4 is a block diagram of a fourth embodiment of a digital signal coding device according to the invention.

According to the fourth embodiment depicted in FIG. 4, the breaking-down circuit 2c has only outputs $2c_2$ which are connected to a circuit for dividing into blocks 4c. The circuit 4c has outputs $4c_1$ connected to a coding circuit 5c.

The coding circuit 5c includes quantification circuits $51c_w$, where w is an integer from 1 to 2, for example. Each quantification circuit $51c_w$ uses a quantification mode $Q_w$ which is peculiar to it, for example scalar quantification or vectorial quantification. The coding circuit 5c also includes entropic coding circuits $52c_j$, where j is an integer from 1 to 10, for example. Each entropic coding circuit $52c_j$ uses an entropic coding $E_j$ which is peculiar to it, for example a Huffman coding.

An output $5c_1$ of the circuit 5c is connected to a processing circuit 9c, which is for example a transmission circuit or a memory.

For the four embodiments, the image source 1, 1a, 1b, 1c is a device for generating a series of digital samples representing an image IM. The source 1, 1a, 1b, 1c has an image memory and supplies a digital image signal SI to the input of the breakdown circuit 2, 2a, 2b, 2c. The image signal SI is a series of digital words, for example octets. Each octet value represents a pixel of the image IM, here with 256 grey levels, or a black and white image.

The circuit for breaking down into sub-band signals 2, 2a, 2b, 2c, or analysis circuit, is a conventional assembly of filters, respectively associated with decimators by two, which filter the image signal in two directions, in sub-band signals of high and low spatial frequencies. The four circuits 2, 2a, 2b, 2c being the same, only the first one is detailed. According to FIG. 5, the circuit 2 has three successive analysis units for breaking down the image IM into sub-band signals according to three resolution levels.

In general terms, the resolution of a signal is the number of samples per unit length used to represent this signal. In the case of an image signal, the resolution of a sub-band signal is related to the number of samples per unit length for representing this sub-band signal. The resolution of a sub-band signal depends on the number of decimations performed, the decimation factor and the resolution of the initial signal.

The first analysis unit receives the digital image signal and applies it to two digital filters, respectively low pass and high pass 21 and 22, which filter the signal in a first direction, for example horizontal in the case of an image signal. After passing through decimators by two 210 and 220, the resulting filtered signals are respectively applied to two low pass filters 23 and 25, and high pass filters 25 and 26, which filter them in a second direction, for example vertical in the case of an image signal. Each resulting filtered signal passes through a respective decimator by two 230, 240, 250 and 260. The first unit delivers at its output four sub-band signals $LL_1$, $LH_1$, $HL_1$ and $HH_1$ of the highest resolution $RES_1$ in the breakdown.

The sub-band signal $LL_1$ includes the low-frequency components, or coefficients, in both directions, of the image signal. The sub-band signal $LH_1$ includes the components, of low frequency in a first direction and of high frequency in a second direction, of the image signal. The sub-band signal $HL_1$ includes the high-frequency components in the first direction and the low-frequency components in the second direction. Finally, the sub-band signal $HH_1$ includes the high-frequency components in both directions.

Each sub-band signal is an image constructed from the original image, which contains information corresponding to an orientation respectively vertical, horizontal and diagonal of the contours of the image, in a given frequency band.

The sub-band signal $LL_1$ is analysed by means of an analysis unit analogous to the previous one for supplying four sub-band signals $LL_2$, $LH_2$, $HL_2$ and $HH_2$ with an intermediate resolution level $RES_2$ in the breakdown. The sub-band signal $LL_2$ includes the low-frequency components in both analysis directions, and is in its turn analysed by the third analysis unit analogous to the two previous ones. The third analysis unit supplies sub-band signals $LL_3$, $LH_3$, $HL_3$ and $HH_3$, of lowest resolution $RES_3$ in the breakdown, resulting from the division of the sub-band signal $LL_2$ into sub-band signals.

Each of the sub-band signals of resolution $RES_2$ and $RES_3$ corresponds also to an orientation of the image.

The breakdown performed by the circuit 2 is such that a sub-band signal of a given resolution is divided into four sub-band signals of lower resolution and therefore has four times more coefficients than each of the sub-band signals of lower resolution.

Figure 7:
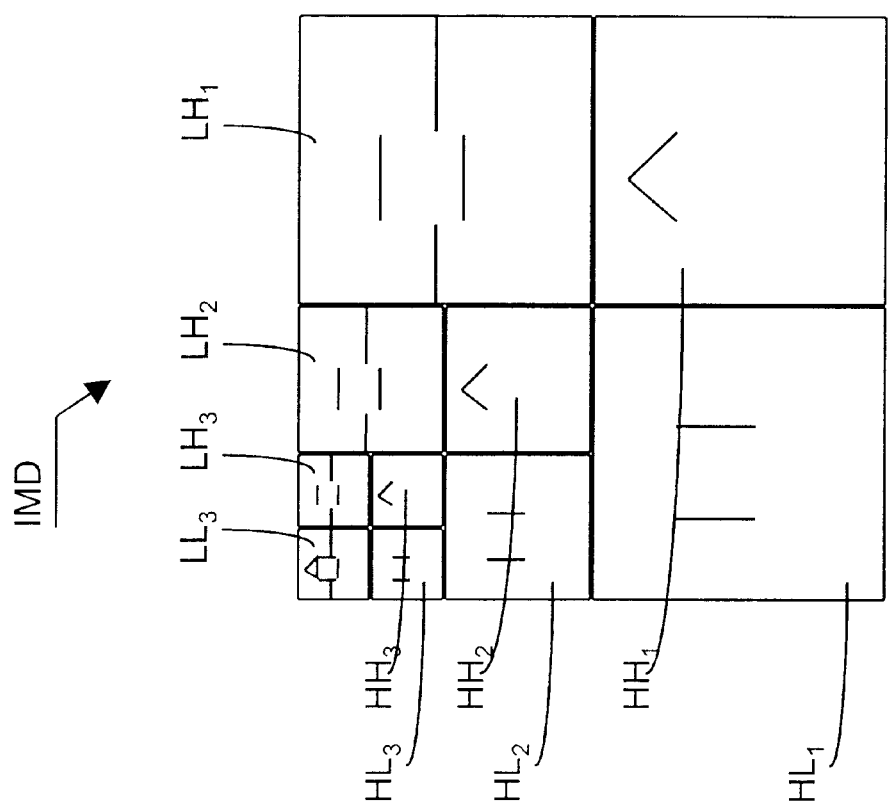
FIG. 7 is an image broken down into sub-band signals by the circuit of FIG. 5.
Figure 6:
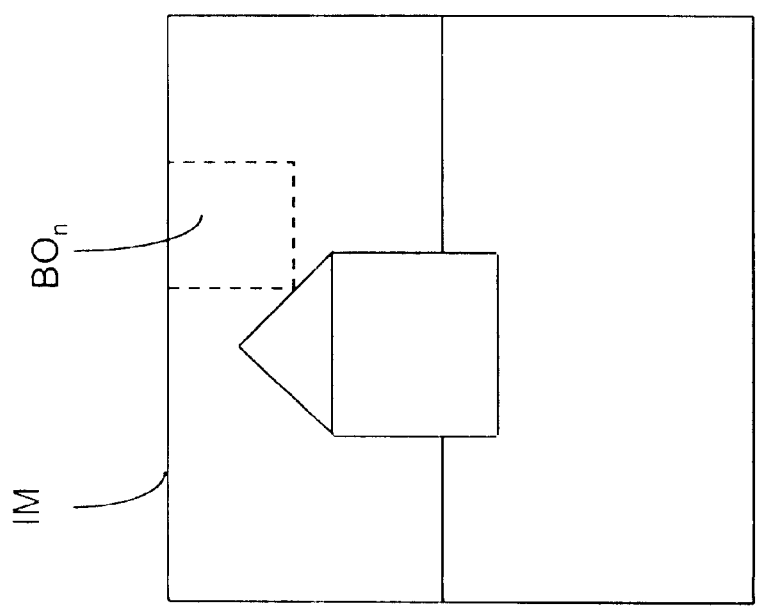
FIG. 6 is a digital image to be coded by the coding device according to the invention.

A digital image IM output from the image source 1 is depicted schematically in FIG. 6, whilst FIG. 7 depicts the image IMD resulting from the breakdown of the image IM, into ten sub-band signals according to three resolution levels, by the circuit 2. The image IMD has as much information as the original image IM, but the information is divided in frequency according to three resolution levels.

The lowest resolution level $RES_3$ includes the sub-band signals $LL_3$, $HL_3$, $LH_3$ and $HH_3$. The second resolution level $RES_2$ includes the sub-band signals $HL_2$, $LH_2$ and $HH_2$ and the highest resolution level $RES_1$ includes the sub-band signals $HL_1$, $LH_1$ and $HH_1$.

The sub-band signal $LL_3$ of lowest frequency is a reduction of the original image. The other sub-band signals are detail sub-band signals.

Naturally, the number of resolution levels, and consequently of sub-band signals, can be chosen differently, for example thirteen sub-band signals and four resolution levels, for a two-dimensional signal such as an image. The number of sub-band signals per resolution level can also be different. The analysis and synthesis circuits are adapted to the dimension of the processed signal.

The sub-band signal $LL_3$ of lowest resolution $RES_3$ is applied to the coding circuit 3, which codes it into a coded, or compressed, sub-band signal $LLc_3$.

According to the three first embodiments, the coding circuit 3, 3a, 3b effects a DPCM (Differential Pulse Code Modulation) coding, which is a coding by linear prediction, with loss. Each pixel of the sub-band signal to be coded $LL_3$ is predicted according to its neighbours, and this prediction is subtracted from the value of the pixel under consideration, for the purpose of forming a differential "image" which has less correlation between pixels than the original image. The differential image is then quantified and coded by means of a Huffman coding in order to form the coded sub-band signal $LLc_3$.

Alternatively, the coding circuit 3, 3a, 3b effects a coding by discreet cosine transformation (DCT), or by vectorial quantization.

It should be noted that, for the first embodiment, the sub-band signal of lowest frequency is preferably processed separately. This is because this sub-band signal contains a large quantity of information, and it is preferable to code it with the highest precision possible, without setting the unit to zero. However, in order to simplify implementation, it is possible to code the sub-band signal of lowest frequency like the detail sub-band signals.

According to the third embodiment (FIG. 3), the coding circuit 3b supplies the coded sub-band signal $LLc_3$ to the processing circuit 9b and to the decoding circuit 31b, which decodes it and forms a decoded sub-band signal $LLd_3$.

Figure 5:
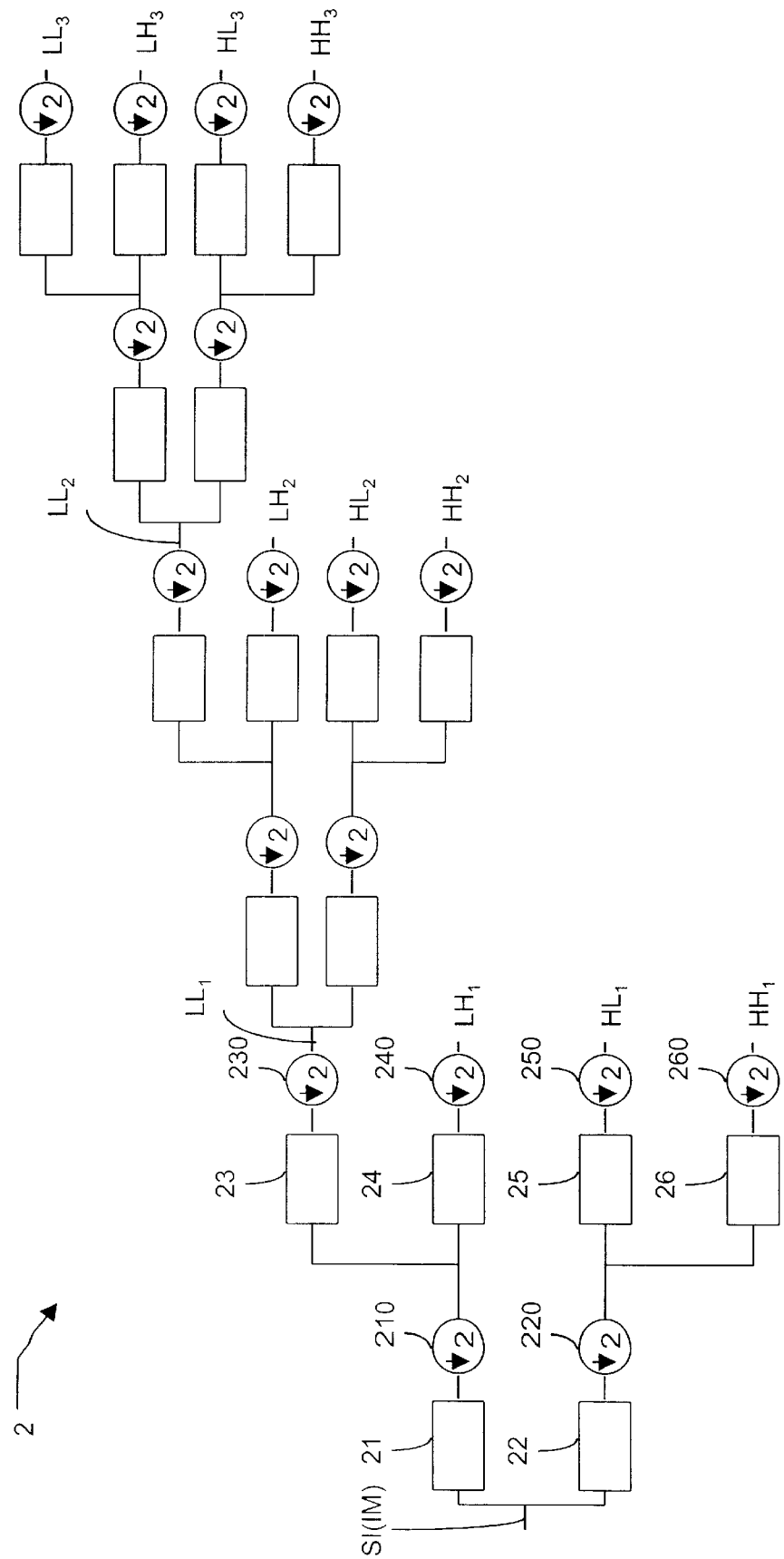
FIG. 5 is a circuit for breaking down into frequency sub-band signals, included in the devices of FIGS. 1 to 4.

The decoding circuit 31b performs operations which are the reverse of those of the coding circuit 3b and supplies the decoded sub-band signal $LLd_3$ to the circuit 32b for breaking down into sub-band signals which is similar to the first analysis block of the circuit 2 previously described (FIG. 5). The circuit 32b forms four sub-band signals $LL_4$, $LH_4$, $HL_4$ and $HH_4$ of resolution $RES_4$ which are supplied to the circuit for dividing into blocks 4b. As disclosed hereinafter, the sub-band signals $LH_4$, $HL_4$ and $HH_4$ are used for coding the sub-band signals $LH_3$, $HL_3$ and $HH_3$ respectively.

According to the fourth embodiment (FIG. 4), the sub-band signal of lowest frequency is not processed separately.

It should be noted that breaking down the signal into frequency sub-band signals is not essential for the fourth embodiment of the invention, which can be implemented for a digital signal which had not been broken down into sub-band signals.

It should also be noted that a sub-band signal of the digital signal is itself a digital signal, and that according to the fourth embodiment of the invention it is processed independently of the other sub-band signals.

For all the embodiments, the sub-band signals formed by the circuit 2, 2a, 2b, 2c are supplied to the division circuit 4, 4a, 4b, 4c, in an order of sub-band signal which is in principle any order, but predetermined.

Figure 8:
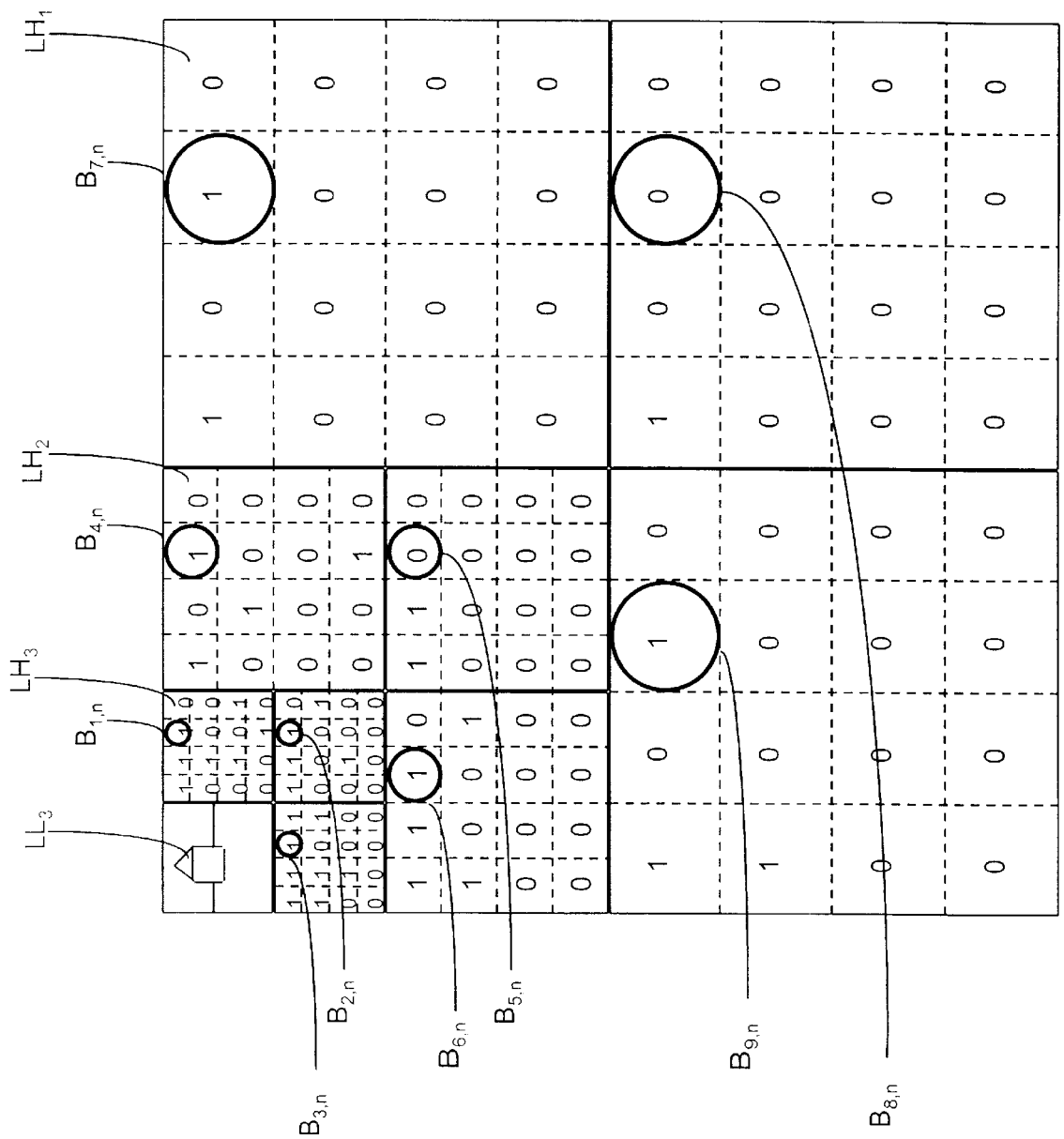
FIG. 8 is an image broken down into sub-band signals and then divided into blocks.

As depicted in FIG. 8, the division circuit 4, 4a, 4b, 4c, divides each detail sub-band signal into blocks. According to the embodiments chosen, all the sub-band signals supplied to the circuit 4, 4a, 4b, 4c, are divided into the same number N of blocks $B_{i,n}$, where the index i is an integer, here between 1 and 9, which represents the order of the sub-band signal under consideration, and the index n, between 1 and N, is an integer which represents the order of the block in the sub-band signal under consideration. The blocks are here square in shape, but can in a variant be rectangular in shape. In general terms, a block is a set of coefficients extracted from the sub-band signal in order to form a vector.

The order of the blocks is in principle any order, but predetermined. For practical reasons, the blocks are ordered in the same way in all the sub-band signals, for example from left to right and from top to bottom.

As a consequence of the mode of dividing into blocks, the surface of the blocks is divided by four, passing from the resolution $RES_1$ to the resolution $RES_2$, and from the resolution $RES_2$ to the resolution $RES_3$.

This division is simple to implement, since all the sub-band signals are divided into the same number of blocks. However, except for the second embodiment, for implementing the invention, the number and format of the blocks can be different from one sub-band signal to another.

For the second embodiment, the relation between blocks of different sub-band signals are important.

For example, an "original" block $BO_n$ (FIG. 6), 16×16 pixels in size, is considered in the original image. In each sub-band signal of resolution $RES_1$, the original block $BO_n$ corresponds to a block $B_{7,n}$, $B_{8,n}$ and $B_{9,n}$, 8×8 pixels in size. In each sub-band signal of resolution $RES_2$, the original block corresponds to a block $B_{4,n}$, $B_{5,n}$ and $B_{6,n}$, 4×4 pixels in size, and to a block $B_{1,n}$, $B_{2,n}$ and $B_{3,n}$, 2×2 pixels in size, in each sub-band signal of resolution $RES_3$ (FIG. 8).

The original block thus corresponds to nine blocks in the detail sub-band signals. All blocks in the detail sub-band signals can thus be put into groups; a given group contains a block from each detail sub-band signal, and corresponds to part, here a block, of the original image. Of course, it is possible to form groups of blocks coming solely from certain detail sub-band signals, provided that these blocks correspond to the same part of the original image. It is also possible to consider a number of adjacent blocks in each detail sub-band signal, forming sub-groups, then to group these sub-groups by taking a sub-group from each detail sub-band signal, or from certain detail sub-band signals, always provided that the blocks under consideration correspond to the same part of the original image.

According to the first embodiment (FIG. 1), the coding circuit 5, codes each block $B_{i,n}$ supplied by the circuit 4 according to the first coding mode. This mode consists of setting all the coefficients of the block to a predetermined value, for example the value zero. This coding is very economical in numbers of bits, since it does not entail the transmission or storage of any coding data, and consequently requires a zero transmission rate. However, the coding error may be great if the block under consideration is not of low energy.

The coding circuit 6 codes each block $B_{i,n}$ supplied by the circuit 4 by means of a second coding mode, here by uniform scalar quantization of each of the coefficients of the block and then coding of the indices resulting from the quantization by means of a Huffman coding.

As a variant, the blocks can be coded according to another coding method, for example by vectorial quantization. The coding method used must be able to code precisely a block containing a large quantity of information.

The second coding mode can itself include a plurality of coding modes, the selection of which, for each of the blocks to be coded, will be disclosed later.

For each of the blocks, the circuit 7 compares the two codings according to a criterion for selecting the most appropriate coding, according to this criterion, for each block under consideration. To this end, the circuit 7 determines the transmission rates $R_{1,i,n}$ and $R_{2,i,n}$ needed for transmitting the block coded by each of the two circuits 5 and 6, as well as the coding errors, or distortion, $D_{1,i,n}$ and $D_{2,i,n}$ caused by the coding effected by each of the two circuits 5 and 6. The errors $D_{1,i,n}$ and $D_{2,i,n}$ measure respectively the quadratic error brought into the reconstructed image by the coding of the block under consideration, according to the first and second coding mode. Where the breakdown into sub-band signals is orthogonal, the errors $D_{1,i,n}$ and $D_{2,i,n}$ are equal to the quadratic errors between the original block and the reconstructed block.

The circuit 7 next compares, for each of the blocks, the sums $R_{1,i,n} + \lambda.D_{1,i,n}$ and $R_{2,i,n} + \lambda.D_{2,i,n}$, where $\lambda$ is a coefficient for adjusting the compression to distortion ratio. The coding for which the sum is the lowest is selected, for each of the blocks under consideration.

An indicator $I_{i,n}$ is associated with each of the blocks for indicating which is the coding selected by the circuit 7. The indicator $I_{i,n}$ is for example a bit which is set to zero if the block under consideration is coded by setting to zero, and which is set to one if the block under consideration is coded by scalar quantization.

The circuit 7 transmits to the processing circuit 8 the indicator $I_{i,n}$ of each coded block, associated with the coding data for the block under consideration, where the block under consideration is coded by scalar quantization.

According to the second embodiment (FIG. 2), The coding block 5a codes each block $B_{i,n}$ supplied by the circuit 4a according to M coding modes. Thus the first coding circuit $C_1$ codes each block $B_{i,n}$ according to the first coding mode. For example, this mode consists of setting all coefficients of the block to the value zero. This coding is highly economical in number of bits, since it requires a zero transmission rate. However, the coding error could be large if the block under consideration is not of low energy.

Each of the coding circuits $C_1$ to $C_M$ codes each block $B_{i,n}$ supplied by the circuit 4a according to a coding mode specific to it. For example, one coding mode is a uniform scalar quantization of each coefficient of the block, and then coding of the indices resulting from the quantization by a Huffman coding.

According to another coding mode, the blocks may be coded according to another coding method, for example by vectorial quantization.

For each block, the circuit 7a compares the codings carried out according to a criterion for selecting the most appropriate coding, according to this criterion, for each block under consideration.

To that end, the circuit 7a determines the transmission rates $R_{1,i,n}$ to $R_{M,i,n}$ necessary for transmitting the block coded by each of the circuits $C_1$ to $C_M$, as well as the coding errors, or distortion, $D_{1,i,n}$ to $D_{M,i,n}$ caused by the coding carried out by each of the circuits $C_1$ to $C_M$. The errors $D_{1,i,n}$ to $D_{M,i,n}$ measure respectively the quadratic error introduced into the reconstructed image by the coding of the block under consideration, according to each coding mode. Where the breakdown into sub-band signals is orthogonal, the errors $D_{1,i,n}$ to $D_{M,i,n}$ are equal to the quadratic errors between the original block and the reconstructed block.

The circuit 7a next compares, for each block, the sums $R_{1,i,n}+\lambda.D_{1,i,n}$ to $R_{M,i,n}+\lambda.D_{M,i,n}$, where $\lambda$ is a coefficient for controlling the compression/distortion ratio. The coding for which the sum is smallest is selected, for each block under consideration.

An indicator $I_{i,n}$ is associated with each of the blocks $B_{i,n}$ in order to indicate which coding is selected by the circuit 7a. The indicator $I_{i,n}$ is for example a word capable of taking M different values and whose value represents the coding mode chosen for coding the block $B_{i,n}$.

The circuit 7a transmits, to the processing circuit 9a, the indicator $I_{i,n}$ of each coded block, associated with the data for coding the block under consideration.

The set of indicators $I_{i,n}$ forms a table which has as many elements as there are blocks. Breakdown of the image is such that there is the same correspondence between the indicators as between the blocks of the different sub-band signals. The indicators can therefore be grouped together in a word, here a group of nine, according to this correspondence. A word thus contains an indicator corresponding to a block of each of detail sub-band signal, these blocks having the same spatial support in the original image.

Alternatively, the words formed contain an indicator corresponding to a block of certain of the detail sub-band signals, or contain indicators corresponding to a number of blocks of each, or certain, of the detail sub-band signals.

In all cases, these blocks have the same spatial support in the original image, in other words, the indicators in a given word correspond to a given part, here a block, of the original image. The indicators in this word are consequently interdependent. According to this interdependence, the coding circuit 8 codes the indicator words according to an entropic type coding. The coding is also of the lossless type, since it is necessary to correctly find the indicators at decoding, in order to find without error the coding mode used for coding each block and perform the corresponding decoding.

The coding is for example a Huffman coding, or as a variant an arithmetic coding, or an LZW coding.

The third embodiment is now considered. In consequence of the method of dividing into blocks, the surface of the blocks is divided by four, going from resolution $RES_1$ to resolution $RES_2$, from resolution $RES_2$ to $RES_3$, and from resolution $RES_3$ to resolution $RES_4$.

To any given block, referred to as the target block $B_{i,n}$ of the sub-band signals of resolution $RES_1$, $RES_2$ and $RES_3$, there corresponds a block, referred to as the first source block, in the sub-band signal of the same orientation and of immediately lower resolution $RES_2$, $RES_3$ and $RES_4$. The first source block has the same size as the target block, and these two blocks are situated at the same location in their respective sub-band signals, except for the resolution factor.

The coding circuit 5b codes each block $B_{i,n}$ of the detail sub-band signals. A target block $B_{i,n}$ is coded according to a source block in the sub-band signal of the same orientation and of lower resolution, with respect to the sub-band signal of the target block under consideration. For this purpose, the coding circuit has a predetermined set of transformations $T=\{T_1, T_2, \ldots T_M\}$, an energy threshold SE, a number of bits NB and a counter represented by a variable k, where k is an integer varying between 0 and a maximum value, for example $2^{NB}$. The variable k is equal to zero at the start of the search.

For a given target block $B_{i,n}$ of a given detail sub-band signal, the circuit 5b determines initially a set of source blocks able to allow a precise coding of the target block. The source blocks are situated in the sub-band signal of the same orientation and of lower resolution, with respect to the sub-band signal of the target block under consideration.

The circuit 5b first of all seeks the first source block $B_{m,n}$ which corresponds to the target block under consideration, in the sub-band signal of lower resolution and same orientation. The energy $E_{m,n}$ of the source block is calculated in a conventional fashion (the sum of the squares of the coefficients of the block) and compared with the threshold SE. If the energy $E_{m,n}$ is less than the threshold SE, then the first source block $B_{m,n}$ is eliminated from the search. This is because it has been found that a source block having a low energy would provide a less precise coding than another source block having a greater energy.

If the energy of the first source block is greater than the threshold SE, then the counter k is incremented by one unit and the first source block is selected and associated with the value of the counter. The first source block is then referenced $BS_1$. A search is then carried out to determine which is the transformation $T_m$ of the set T, with m an integer between 1 and M, which minimises a predetermined distance between the target block $B_{i,n}$ and the selected source block $BS_1$ to which the transformation is applied. The distance is for example the root mean square error. The transformation $T_m$ and the value of the counter k which represents the selected source block $BS_1$ are a compressed form of the target block $B_{i,n}$. This compressed form is stored to memory.

According to the preferred embodiment, the transformations are multiplications by real factors. The application of a transformation to a source block consists of multiplying each pixel of the source block by the real factor of the transformation. As a variant, other types of transformation can be used, for example rotations, or first or second degree functions.

Figure 9:
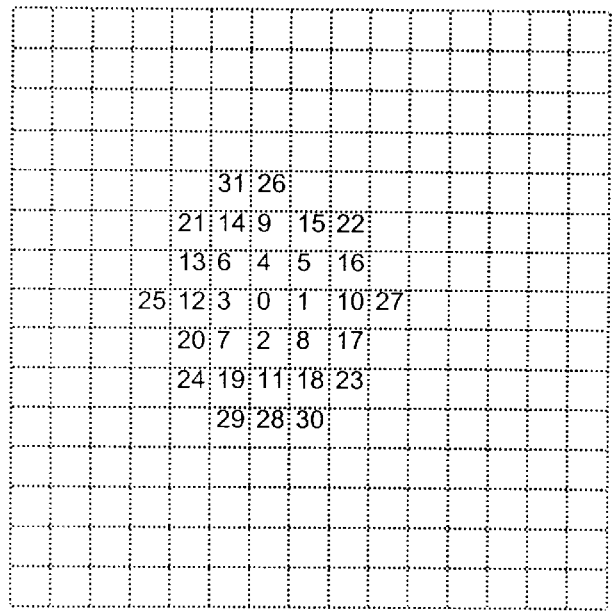
FIGS. 9 and 10 illustrate the seeking of source blocks used in the third embodiement of the invention.
Figure 10:
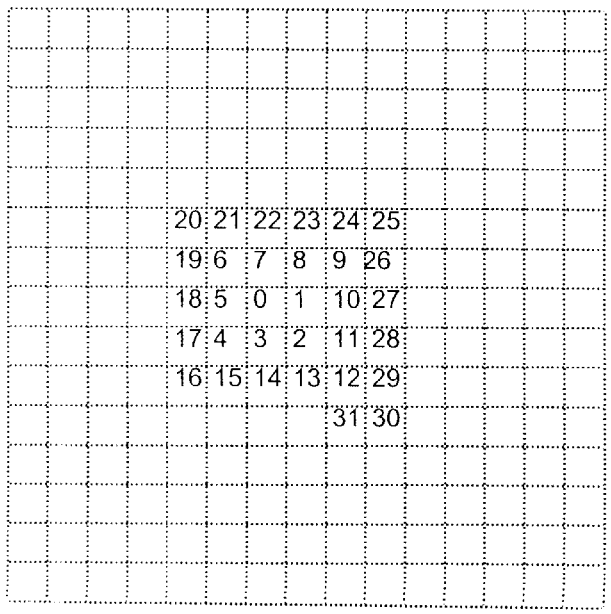

As long as the counter k is not at the maximum value $2^{NB}$, another source block is sought in the source sub-band signal. The following blocks are taken into account in a predetermined order, according to their position with respect to the first source block. The order is preferably such that the blocks under consideration have a distance which is substantially increasing with respect to the first source block, for example as illustrated in FIG. 9. According to the preferred embodiment, they substantially cover a spiral line centred on the first source block, as illustrated in FIG. 10. The source blocks are formed so as to overlap partially, and are for example offset by one coefficient between one source block and the following one. According to other embodiments, the offset can be greater, or the source blocks can be adjacent.

For each of the source blocks, the circuit 5b selects the source block under consideration if its energy is greater than the threshold SE. If the response is positive, the counter k is incremented by one unit, the source block is selected and referenced $BS_k$, and the transformation $T_m$ which minimises the distance between the target block $B_{i,n}$ and the source block under consideration $BS_k$ to which the transformation is applied, is determined.

The coding circuit 5b tests as many source blocks as necessary for selecting amongst these $2^{NB}$ blocks having an energy greater than the threshold SE, for each of which there are stored the value of the counter k and a transformation of the set T. The result of this phase is a set of $2^{NB}$ pairs {k, m} of selected source blocks $BS_k$ and transformations $T_m$.

Secondly, the coding circuit 5b selects the pair {k, m} for which the distortion with the target block is at a minimum. The pair {k, m} which is the compressed form of the target block under consideration is transmitted to the decoding circuit 6b.

The decoding circuit 6b decodes the block and supplies the decoded block $Bd_{i,n}$ to the buffer memory 7b. The decoding consists of seeking the source block of ranking k having an energy greater than the threshold SE and applying the transformation $T_m$ to the source block $BS_k$. The decoded blocks form decoded sub-band signals. A decoded sub-band signal is then used for coding the blocks of the sub-band signal of the same orientation and higher resolution.

This is because the source blocks used by the circuit 5b are blocks coming from frequency sub-bands successively coded and then decoded; in the decoding device described hereinafter, the source blocks will necessarily have this characteristic, since only decoded information will then be available. In order to avoid propagation of the coding approximations, the coding and decoding are performed using the same source blocks. The coding device also uses decoded information for coding the frequency sub-bands. The coding device must therefore extract the source blocks from a sub-band signal which has previously been coded and then decoded.

This is why the sub-bands are coded by increasing resolution. The sub-bands $LH_3$, $HL_3$ and $HH_3$ of resolution $RES_3$ are first of all coded from sub-bands which are coded and then decoded $LH_4$, $HL_4$ and $HH_4$, respectively. Then the sub-bands $LH_2$, $HL_2$ and $HH_2$ of resolution $RES_2$ are coded from the coded and then decoded sub-bands $LH_3$, $HL_3$ and $HH_3$ respectively, and so on.

The coding circuit 5b transmits each coded block to the processing circuit 9b.

According to the fourth embodiment (FIG. 4), The coding circuit 5c codes each block $B_{i,n}$ supplied by the circuit 4c. For this purpose, the coding circuit selects a quantification circuit $51c_w$ and an entropic coding circuit $52c_j$ for each of the blocks to be coded. The selection of the circuits $51c_w$ and $52c_j$ will be disclosed in detail later.

The quantification circuit $51c_w$ quantifies each block $B_{i,n}$ supplied by the circuit 4c and delivers a series of symbols to the entropic coding circuit $52c_j$, which transforms this series of symbols into a binary series.

An indicator $I_{i,n}$ is associated with each of the blocks in order to indicate which coding is selected by the circuit 5c, that is to say which are the quantification $51c_w$ and entropic coding $52c_j$ circuits which are selected. The indicator $I_{i,n}$ is for example a word whose value represents the coding selected (quantification and entropic coding).

The circuit 5c transmits, to the processing circuit 9c, the indicator $I_{i,n}$ of each coded block, associated with the coding data of the block under consideration.

With reference to FIGS. 11 to 14, the decoding devices according to the four embodiments perform overall operations which are the reverse of those of the coding devices. The decoding device is integrated into an apparatus 200, 200a, 200b, 200c which is for example a digital image reader, or a digital video sequence reader, or a data base management system, or a computer.

The same apparatus can include both the coding device and the decoding device according to the invention, so as to perform coding and decoding operations.

The decoding device has a coded data source 10, 10a, 10b, 10c which includes for example a receiving circuit associated with a buffer memory.

Figure 11:
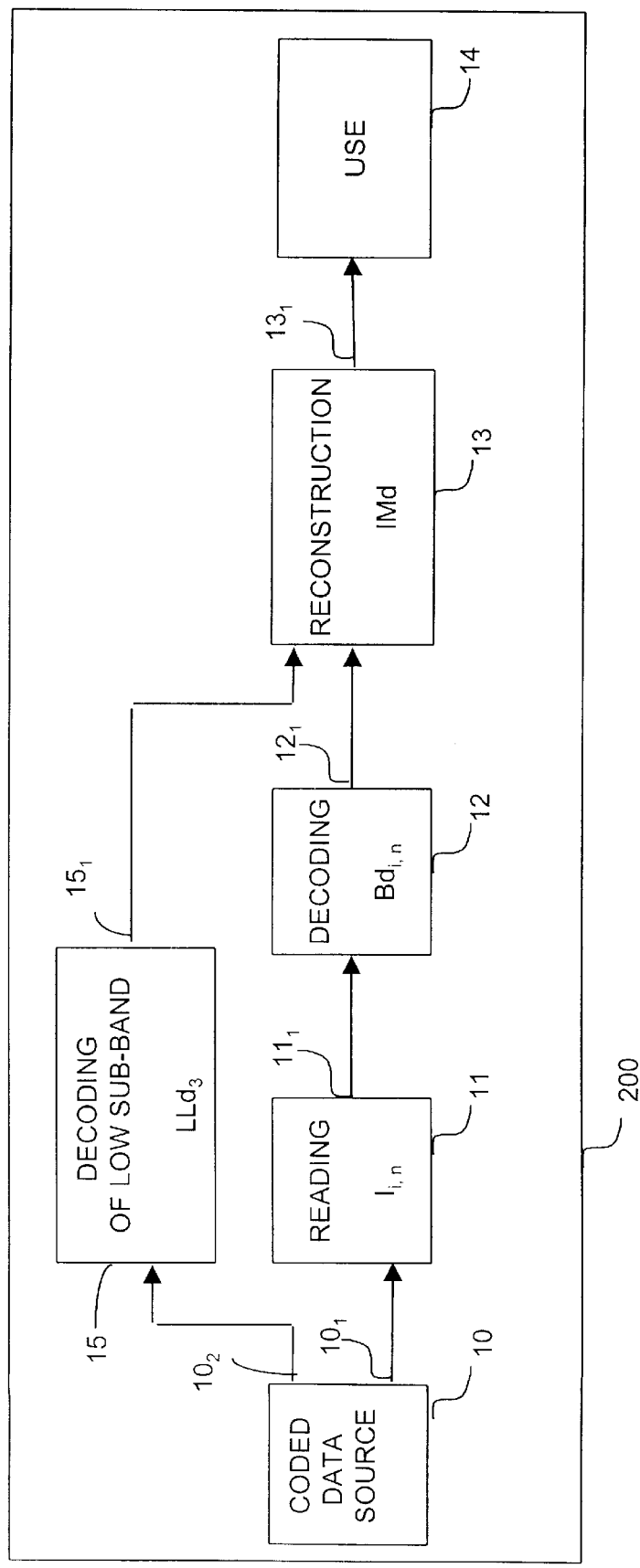
FIG. 11 is a block diagram of a first embodiment of a decoding device according to the invention.

According to the first embodiment depicted in FIG. 11, a first output $10_1$ of the circuit 10 is connected to a circuit 11 of a reader of an indicator $I_{i,n}$, an output $11_1$ of which is connected to a decoding circuit 12.

The decoding circuit 12 has an output $12_1$ connected to a reconstruction circuit 13. The latter has an output $13_1$ connected to a circuit 14 for using decoded data, including for example image display means.

The circuit 10 supplies coded data to the circuit 11, which determines the coding mode used for each of the blocks by analysing the indicator $I_{i,n}$.

If the indicator $I_{i,n}$ indicates that the block under consideration is coded by setting to zero, its decoding consists of creating a block, all of whose coefficients are at the value zero. The size of the block created depends on the sub-band signal currently being decoded, and is for example determined by the index of the block.

If the indicator $I_{i,n}$ indicates that the block under consideration is coded by scalar quantization, the coding data of the block under consideration are read and decoded by the circuit 12 which forms a decoded block. For this purpose, the data coded by Huffman coding are read and decoded. The quantization indices corresponding to the coefficients of the block currently being decoded are extracted. The indices are dequantified in order to generate the coefficients of the decoded block $Bd_{i,n}$.

The circuit 12 supplies decoded blocks $Bd_{i,n}$ to the reconstruction circuit 13, which is a synthesis circuit corresponding to the analysis circuit 2 described previously, and reconstructs the image IMd corresponding to the decoded sub-bands.

A second output $10_2$ of the circuit 10 is connected to a decoding circuit 15 of the sub-band of lowest frequency, a first output $15_1$ of which is connected to the reconstruction circuit 13.

The decoding circuit 15 performs operations which are the reverse of those of the coding circuit 3 and supplies the decoded sub-band $LLd_3$ to the reconstruction circuit 13.

Figure 12:
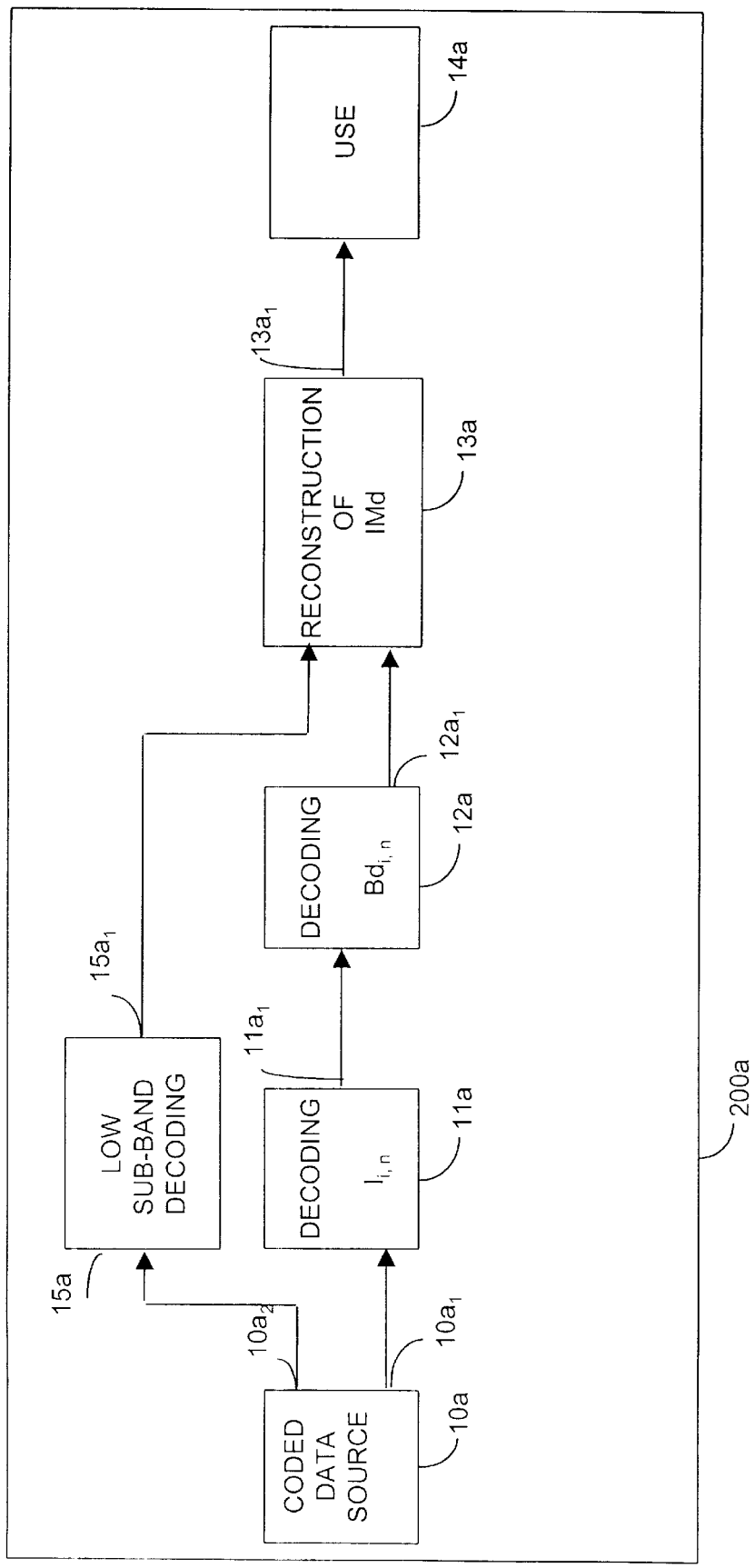
FIG. 12 is a block diagram of a second embodiment of a decoding device according to the invention.

According to the second embodiment depicted in FIG. 12, a first output $10a_1$ of the circuit 10a is connected to a circuit 11a for decoding the indicator words $I_{i,n}$ an output $11a_1$ of which is connected to a decoding circuit 12a.

The decoding circuit 12a has an output $12a_1$ connected to a reconstruction circuit 13a. The latter has an output $13a_1$ connected to a circuit 14a for using decoded data, having for example image display means.

The circuit 10a supplies coded data to the circuit 11a, which decodes the indicator words according to a Huffman decoding, for example. The decoded indicator words supply the indicators of each of the coded blocks. Thus, for a given block, the decoded indicator indicates which coding method was used for coding the block under consideration. The circuit 11a determines the coding mode used for each block by analysing the indicator $I_{i,n}$.

The decoding circuit 12a decodes each block according to the decoding method indicated by the respective indicator.

For example, if the indicator $I_{i,n}$ indicates that the block under consideration is coded by setting to zero, its decoding consists of creating a block, all coefficients of which are at the value zero. The size of the block created depends on the sub-band in the process of decoding, and is for example determined by the index of the block.

If the indicator $I_{i,n}$ indicates that the block under consideration is coded for example by scalar quantization, the data for coding the block under consideration are read and decoded by the circuit 12a which forms a decoded block. For this, the data coded by Huffman coding are read and decoded. The quantization indices corresponding to the coefficients of the block in the process of decoding are extracted. The indices are dequantified in order to generate the coefficients of the decoded block $Bd_{i,n}$.

The circuit 12a supplies the decoded blocks $Bd_{i,n}$ to the reconstruction circuit 13a, which is a synthesis circuit corresponding to the analysis circuit 2a described previously and reconstructs the image IMd corresponding to the decoded sub-band signals.

A second output $10a_2$ of the circuit 10a is connected to a decoding circuit 15a for the lowest frequency sub-band, a first output $15a_1$ of which is connected to the reconstruction circuit 13a.

The decoding circuit 15a performs operations the reverse of those of the coding circuit 3a and supplies the decoded sub-band signal $LLd_3$ to the reconstruction circuit 13a.

Figure 13:
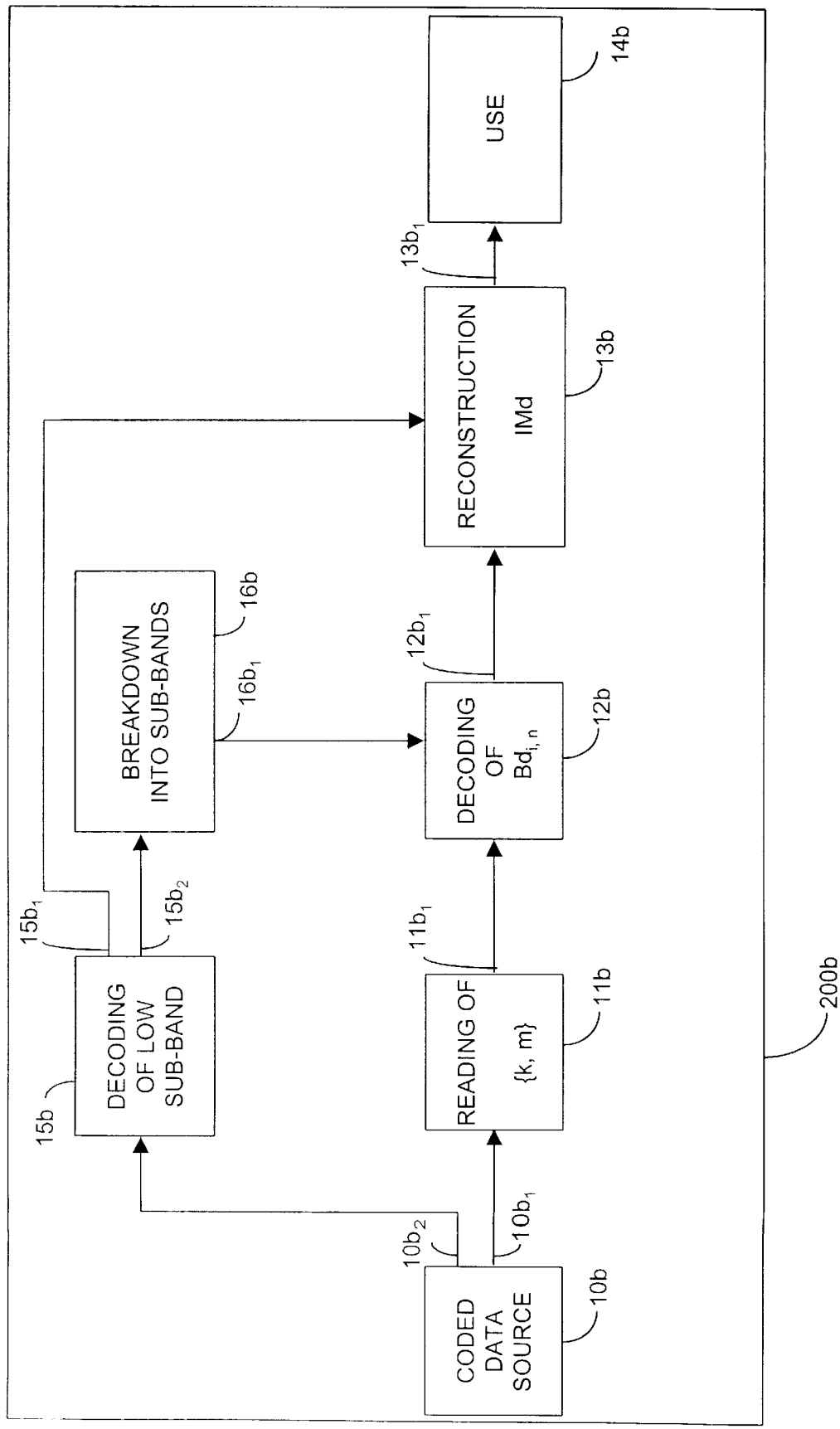
FIG. 13 is a block diagram of a third embodiment of a decoding device according to the invention.

According to the third embodiment depicted in FIG. 13, a first output $10b_1$ of the circuit 10b is connected to a circuit 11b for reading compressed forms {k,m}, an output $11b_1$ of which is connected to a decoding circuit 12b.

The decoding circuit 12b has an output $12b_1$ connected to a reconstruction circuit 13b. The latter has an output $13b_1$ connected to a circuit 14b for using decoded data, having for example image display means.

The circuit 10b has a second output $10b_2$ connected to a decoding circuit 15b for the low sub-band signal, a first output $15b_1$ of which is connected to the reconstruction circuit 13b and a second output $15b_2$ of which is connected to a circuit for breaking down into sub-bands 16b. The latter has an output $16b_1$ connected to the decoding circuit 12b.

The circuit 10b supplies the coded form $LLc_3$ of the low sub-band signal to the decoding circuit 15b. The latter is identical to the circuit 31b and performs a decoding corresponding to the coding of the circuit 3b (FIG. 3). The decoding circuit 15b supplies the decoded low sub-band signal $LLd_3$ to the reconstruction circuit 13b and to the circuit for breaking down into sub-bands 16b. The latter constructs the sub-bands $LL_4$, $LH_4$, $HL_4$ and $HH_4$. The sub-bands $LH_4$, $HL_4$ and $HH_4$ are intended to decode the detail sub-bands $LH_3$, $HL_3$ and $HH_3$ of the resolution $RES_3$.

The circuit 10b supplies the coded forms of the blocks of the detail sub-bands to the circuit 11b. The coded forms are pairs {k, m}, where k is a ranking of the source block $BS_k$ and m represents a transformation $T_m$ of the set T.

The circuit 11b determines, for each blocks to be decoded, the energy of the source blocks and counts the source blocks whose energy is greater than the threshold SE, until it finds the source block of ranking k. The first source block is the one which has the same location in its sub-band signal as the target block in its sub-band signal, except for the resolution factor. The following source blocks are taken into account in the same order as at coding, for example following a spiral line covered by the source blocks.

The decoding next consists of applying the transformation $T_m$ to the source block of ranking k in order to form the decoded block $Bd_{i,n}$.

The circuit 12b supplies the decoded blocks $Bd_{i,n}$ to the reconstruction circuit 13b, which is a synthesis circuit corresponding to the analysis circuit 2b described previously, and reconstructs the image IMd corresponding to the decoded sub-bands.

Figure 14:
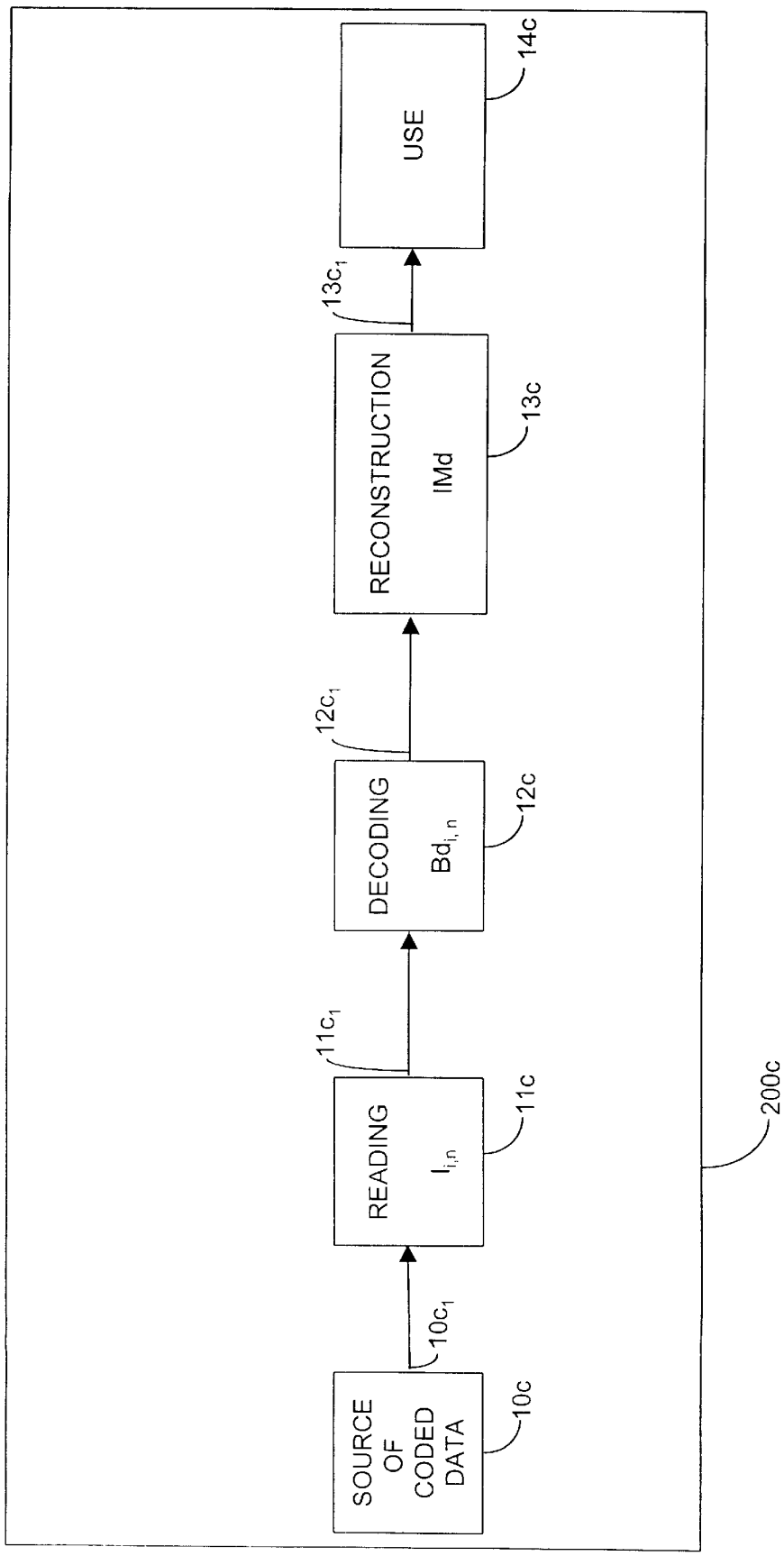
FIG. 14 is a block diagram of a fourth embodiment of a decoding device according to the invention.

According to the fourth embodiment depicted in FIG. 14, an output $10c_1$ of the circuit 10c is connected to a circuit 11c for reading indicators $I_{i,n}$, an output $11c_1$ of which is connected to a decoding circuit 12c.

The decoding circuit 12c has an output $12c_1$ connected to a reconstruction circuit 13c. The latter has an output $13c_1$ connected to a circuit 14c for using decoded data, having for example image display means.

The circuit 10c supplies coded data to the circuit 11c, which determines the coding mode used (quantification and entropic coding) for each of the blocks by analysing the indicator $I_{i,n}$.

The coding data for the block under consideration are read and decoded by the circuit 12c, which forms a decoded block $Bd_{i,n}$. For this purpose, the data coded by entropic coding are read and decoded. The quantification indices corresponding to the coefficients of the block in the process of decoding are extracted. The indices are dequantified in order to generate the coefficients of the decoded block $Bd_{i,n}$.

The circuit 12c supplies the decoded blocks $Bd_{i,n}$ to the reconstruction circuit 13c, which is a synthesis circuit corresponding to the analysis circuit 2c described previously, and reconstructs the image IMd corresponding to the decoded sub-bands.

According to preferred embodiments of the invention, the circuits included in the coding devices depicted in FIGS. 1 to 4, are implemented by a microprocessor associated with random access and read-only memories. The read-only memory has a program for coding each of the data blocks, and the random access memory has registers adapted to record variables modified during the running of the program.

Likewise, the circuits included in the decoding devices depicted in FIGS. 11 to 14, are implemented by a second microprocessor associated with random access and read-only memories. The read-only memory contains a program for decoding each of the data blocks, and the random access memory contains registers adapted to record variables modified during the running of the program.

Four embodiments of method for coding and decoding an image according to the invention will now be detailed. These embodiments are implemented by algorithms which can be, totally or partially, memorised in any storage medium capable of cooperating with microprocessors. This storage medium is integrated or can be detachably mountable on the data coding and decoding devices. For example, the storage medium is a floppy disk, or a CR-ROM.

Figure 15:
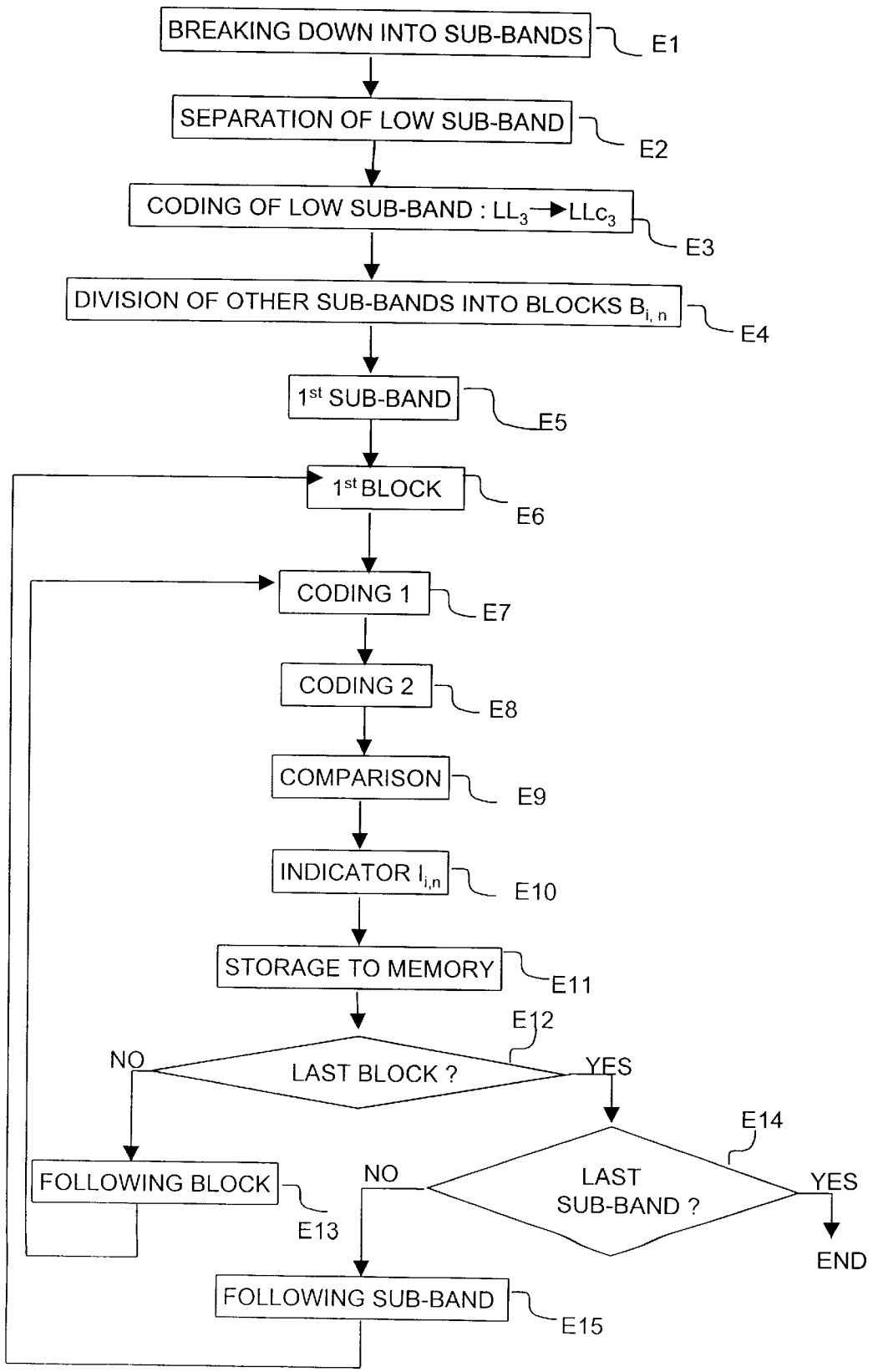
FIG. 15 is an algorithm for coding a digital signal according to the first embodiment of the invention.

With reference to FIG. 15, a first embodiment of a method for coding an image IM according to the invention, implemented in the first embodiment of the coding device, includes steps E1 to E15.

It should be noted that the first embodiment of the invention does not necessarily entail a breakdown according to several resolution levels, but only a breakdown of the signal to be coded into several sub-bands.

The first embodiment of the invention proposes a method of coding a digital signal, including the analysis of the signal for separating the pertinent information and the non-pertinent information, and then the coding of the non-pertinent information according to a first coding mode which offers a high compression ratio, and coding of the pertinent information according to a second coding mode which limits distortion.

The step E1 is the breakdown into sub-bands of the image IM, as depicted in FIG. 7. The result of the step E1 is the sub-bands $LL_3$, $HL_3$, $LH_3$ and $HH_3$ of lowest resolution $RES_3$, the sub-bands $LH_2$, $HL_2$, $HH_2$ of intermediate resolution $RES_2$, and the sub-bands $LH_1$, $HL_1$ and $HH_1$ of highest resolution $RES_1$.

The sub-band signal $LL_3$ is separated from the other sub-bands at the following step E2.

The step E3 codes the sub-band signal $LL_3$ according to a DPCM (Differential Pulse Code Modulation) coding and results in the coded sub-band signal $LLc_3$, which is stored and/or transmitted.

The step E3 is followed by the step E4, which is the division of the other sub-bands into blocks $B_{i,n}$, as depicted in FIG. 8.

The following step E5 is an initialisation in order to consider the first sub-band signal. The sub-bands are taken into account according to an order which is a priori any order, while being predetermined.

The following step E6 is an initialisation in order to consider the first block of the current sub-band signal. The blocks in the current sub-band signal are taken into account according to any predetermined order.

Step E6 is followed by step E7, which is the coding, by setting to a predetermined value, here zero, of the coefficients of the current block $B_{i,n}$. The following step E8 is the coding, by a second coding mode, here scalar quantization, of the current block $B_{i,n}$. The second coding mode can be a plurality of coding modes.

The following step E9 is the comparison of the two coding modes, for the current block, according to a predetermined criterion. The result of the step E9 is selection of one of the coding modes, for the current block $B_{i,n}$.

To that end, the sums $R_{1,i,n}+\lambda.D_{1,i,n}$ and $R_{2,i,n}+\lambda.D_{2,i,n}$ are calculated, where $R_{1,i,n}$ and $R_{2,i,n}$ are the transmission rates necessary for transmitting the current block coded by the two modes, $D_{1,i,n}$ and $D_{2,i,n}$ are the distortions caused in the current block by the two coding modes, and $\lambda$ is a coefficient for controlling the compression/distortion ratio. As disclosed above, the errors $D_{1,i,n}$ and $D_{2,i,n}$ measure respectively the quadratic error introduced into the reconstructed image by the coding of the block under consideration, according to the first and second coding mode. The coding mode for which the sum is smallest is selected, for the current block.

At the following step E10, an indicator $I_{i,n}$ is associated with the current block to indicate which coding mode was selected at the step E9. The indicator $I_{i,n}$ is for example a bit which is set to zero if the block under consideration is coded by setting to zero, and which is set to one if the block under consideration is coded by scalar quantization.

The following step E11 is storing of the value of the indicator $I_{i,n}$ and coded data where the current block is coded by scalar quantization.

The steps E12 and E14 are tests for checking, respectively, whether all blocks of a sub-band signal, and all sub-band signals, have been coded. If there remains at least one block to be coded in the current sub-band signal, the step E12 is followed by the step E13 in order to consider the next block. The step E13 is followed by the step E7 described previously.

If there remains at least one sub-band signal to be coded, the step E14 is followed by the step E15 in order to consider the next sub-band signal. The step E15 is followed by the step E6 described previously.

Figure 16:
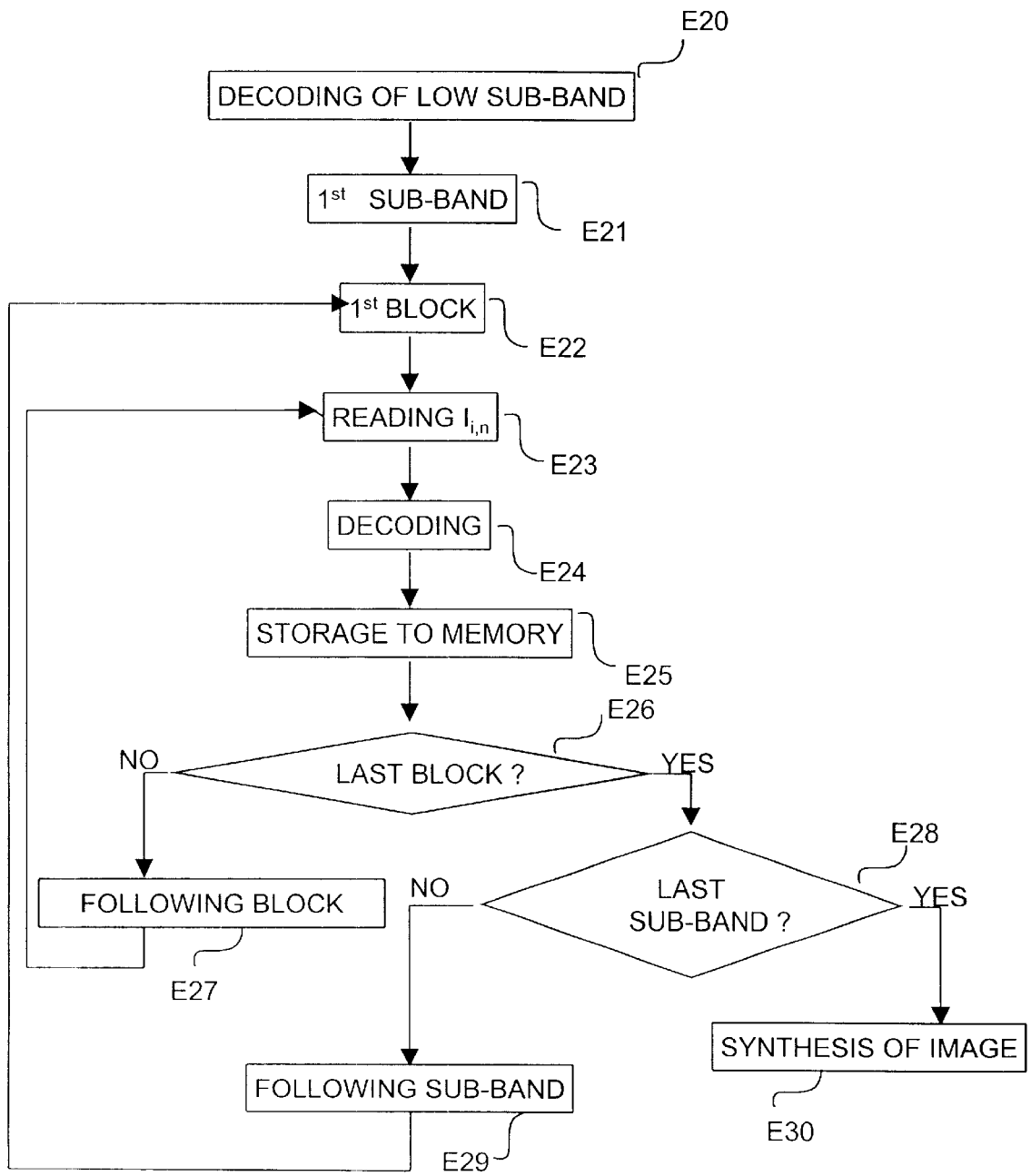
FIG. 16 is an algorithm for decoding a digital signal according to the first embodiment of the invention.

With reference to FIG. 16, a first embodiment of a method of decoding an image IM according to the invention, implemented in the first embodiment of the decoding device, comprises steps E20 to E30.

Step E20 is the decoding of the low sub-band signal $LLC_3$ in order to form a decoded low sub-band signal $LLd_3$, which is stored.

The following step E21 is an initialisation for considering the first detail sub-band signal to be decoded.

Step E21 is followed by step E22, which is an initialisation for considering the first block to be decoded in the current sub-band signal. The sub-band signals are decoded in the same order as at coding, and the blocks in a given sub-band signal are decoded in the same order as at coding, although different orders are possible.

The following step E23 is the reading of the indicator $I_{i,n}$ for determining which coding mode was used for coding the current block.

Step E23 is followed by step E24, which is the decoding of the current block. If the block has been coded by setting to zero, the decoding consists of creating a block for which all the coefficients are at the value zero. The size of the block created depends on the sub-band signal currently being decoded, and is for example determined by the index of the block. If the block has been coded by scalar quantization, it is decoded. For this purpose, as specified above, the data coded by Huffman coding are read and decoded. The quantization indices corresponding to the coefficients of the block currently being decoded are extracted. The indices are dequantified in order to generate the coefficients of the decoded block $Bd_{i,n}$.

The decoded block $Bd_{i,n}$ is stored to memory at the following step E25.

Steps E26 and E28 are tests for checking, respectively, whether all the blocks of a sub-band signal, and all the sub-band signals, have been decoded. If there remains at least one block to be decoded in the current sub-band signal, step E26 is followed by step E27 for considering the following block. Step E27 is followed by the previously described step E23.

If there remains at least one sub-band signal to be decoded, step E28 is followed by step E29 for considering the following sub-band signal. Step E29 is followed by the previously described step E22.

When all the sub-band signals have been decoded, that is to say when the response is positive at step E28, the latter step is followed by the step E30 of constructing the decoded image. The latter can then be displayed, for example.

Figure 17:
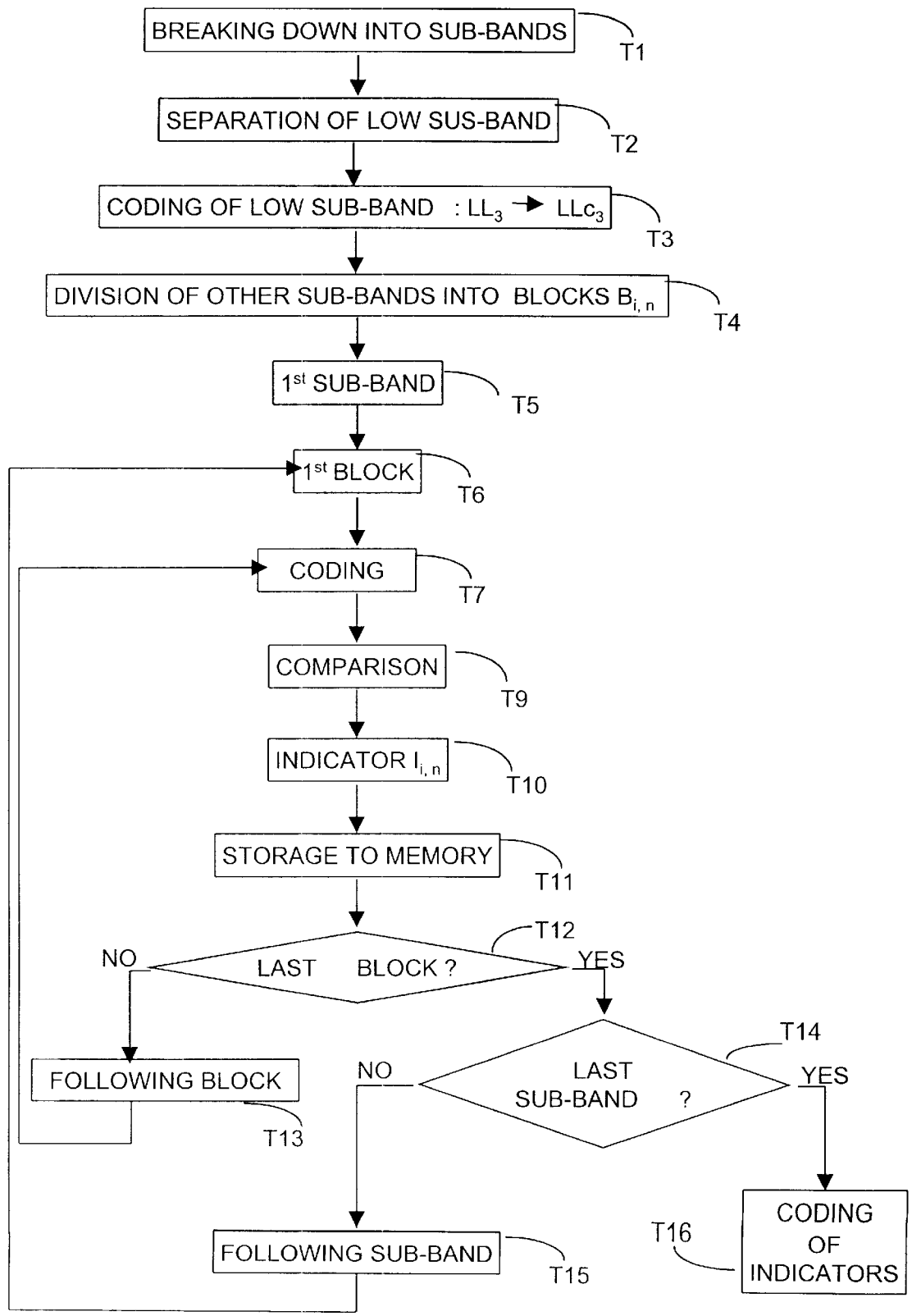
FIG. 17 is an algorithm for coding a digital signal according to the second embodiment of the invention.

With reference to FIG. 17, a second embodiment of a method of coding an image IM, used in the second embodiment of coding device, includes steps T1 to T16. The method uses M coding modes.

The use of several coding modes makes it possible to choose the most suitable coding mode for each of the blocks, which reduces the overall coding error.

An indicator for each block is necessary for the decoding in order to indicate which coding mode has been used. There are therefore as many indicators as blocks, which reduces the compression ratio. The grouping of the indicators into words, which words are then coded, makes it possible to limit the reduction in the compression ratio.

Thus the invention offers overall a ratio between compression ratio and coding error which is high.

Step T1 is the breakdown of the image IM into sub-band signals, as depicted in FIG. 7. Step T1 results in the sub-band signals $LL_3$, $HL_3$, $LH_3$ and $HH_3$ of lowest resolution $RES_3$, the sub-band signals $LH_2$, $HL_2$, $HH_2$ of intermediate resolution $RES_2$ and the sub-band signals $LH_1$, $HL_1$ and $HH_1$ of highest resolution $RES_1$.

The sub-band signal $LL_3$ is separated from the other sub-band signals at the following step T2.

Step T3 codes the sub-band signal $LL_3$ according to a DPCM (Differential Pulse Code Modulation) coding and results in the coded sub-band signal $LLC_3$, which is stored to memory and/or transmitted.

Step T3 is followed by step T4, which is the division of the other sub-band signals into blocks $B_{i,n}$ as depicted in FIG. 8.

According to the second embodiment, all the sub-band signals supplied to the circuit 4 are divided into the same number N of blocks $B_{i,n}$ where the index i is an integer, here between 1 and 9, which represents the order of the sub-band signal under consideration, and the index n, between 1 and N, is an integer which represents the order of the block in the sub-band signal under consideration. The blocks are here square in shape, but can as a variant be rectangular. The order of the blocks can in principle be any order, but predetermined. For practical reasons, the blocks are ordered in the same way in all the sub-band signals, for example from left to right and from top to bottom.

As a consequence of the mode of dividing into blocks, the surface of the blocks is divided by four, going from resolution $RES_1$ to resolution $RES_2$, and from resolution $RES_2$ to resolution $RES_3$. An "original" block of size 16×16 pixels of the original image corresponds to a block of size 8×8 pixels in each of the sub-band signals of resolution $RES_1$. In each of the sub-band signals of resolution $RES_2$, the original block corresponds to a block of size 4×4 pixels and to a block of size 2×2 pixels in each of the sub-band signals of resolution $RES_3$.

The original block thus corresponds to nine blocks in the detail sub-band signals. All the blocks in the detail sub-band signals can thus be put in a group, a given group includes a block of each of the detail sub-band signals, and corresponds to a part, here a block, of the original image. Naturally it is possible to form groups of blocks coming from only some detail sub-band signals, provided that these blocks correspond to one and the same part of the original image. It is also possible to consider several adjacent blocks in each detail sub-band signal, forming sub-groups, then to group these sub-groups by taking a sub-group from each detail sub-band signal, or from certain detail sub-band signals, always providing that the blocks under consideration correspond to the same part of the original image.

The following step T5 is an initialisation for considering the first sub-band signal. The sub-band signals are taken into account in any order in principle, whilst being predetermined.

The following step T6 is an initialisation for considering the first block in the current sub-band signal. The blocks in the current sub-band signal are taken into account in any predetermined order.

Step T6 is followed by step T7, which is the coding of the current block $B_{i,n}$. The block $B_{i,n}$ is coded in accordance with the M predetermined coding modes, notably for example by scalar quantization and setting to zero.

The following step T9 is the comparison of the M coding modes, for the current block, according to a predetermined criterion. Step T9 results in the selection of one of the coding modes, for the current block $B_{i,n}$.

To this end, the sums $R_{m,i,n} + \lambda \cdot D_{m,i,n}$ are calculated, for m integer varying between 1 and M, where $R_{m,i,n}$ is the transmission rate necessary for transmitting the current block coded by means of the coding mode m, $D_{1,i,n}$ is the distortion caused in the current block by the coding mode m, and $\lambda$ is a coefficient for adjusting the compression/distortion ratio. As disclosed above, the error $D_{m,i,n}$ measures the quadratic error brought into the reconstructed image by the coding of the block under consideration. The coding mode for which the sum is the lowest is selected, for the current block. This criterion makes it possible to select, for each block, the most appropriate coding mode.

At the following step T10, an indicator $I_{i,n}$ is associated with the current block for indicating which coding mode was selected at step T9. The indicator $I_{i,n}$ is for example a word able to adopt M different values, and the value of which represents the coding mode chosen for coding the block $B_{i,n}$.

The following step T11 is the storage to memory of the value of the indicator $I_{i,n}$ and coding data proper of the block under consideration.

Steps T12 and T14 are tests for checking respectively whether all the blocks of a sub-band signal and all the sub-band signals have been coded. If there remains at least one block to be coded in the current sub-band signal, step T12 is followed by step T13 for considering the following block. Step T13 is followed by the previously described step T7.

If there remains at least one sub-band signal to be coded, step T14 is followed by step T15 for considering the following sub-band signal. Step T15 is followed by the previously described step T6.

When all the sub-band signals have been coded, step T14 is followed by step T16, which is the coding of the indicators.

The set of indicators $I_{i,n}$ forms a table which includes as many elements as there are blocks. The breakdown of the image is such that there is the same correspondence between the indicators as between the blocks of the different sub-band signals. The indicators can therefore be grouped together in a word, here in groups of nine, according to this correspondence. A word thus has an indicator corresponding to a block of each of the detail sub-band signals, these blocks having the same spatial support in the original image.

According to other embodiments, the words formed include an indicator corresponding to a block of some of the detail sub-band signals or include indicators corresponding to several blocks of each of the, or some of the, detail sub-band signals.

In all cases, these blocks have the same spatial support in the original image, in other words, the indicators of a given word correspond to a given part, here a block, of the original image. The indicators of this word are consequently interdependent. This type of grouping uses the correlation which exists between the different sub-band signals of the digital signal.

According to this interdependence, the indicator words are coded in accordance with a coding of the entropic type. The coding is also of the lossless type, since it is necessary to find the indicators exactly at the time of decoding, in order to find without error the coding mode used in order to code each block and effect the corresponding decoding.

The coding is for example a Huffman coding, which gives satisfactory results, both with regard to compression ratio and ease of implementation, or as a variant is an arithmetic coding, or again an LZW coding.

The set of coded words is associated with the coded forms proper of each of the blocks.

Figure 18:
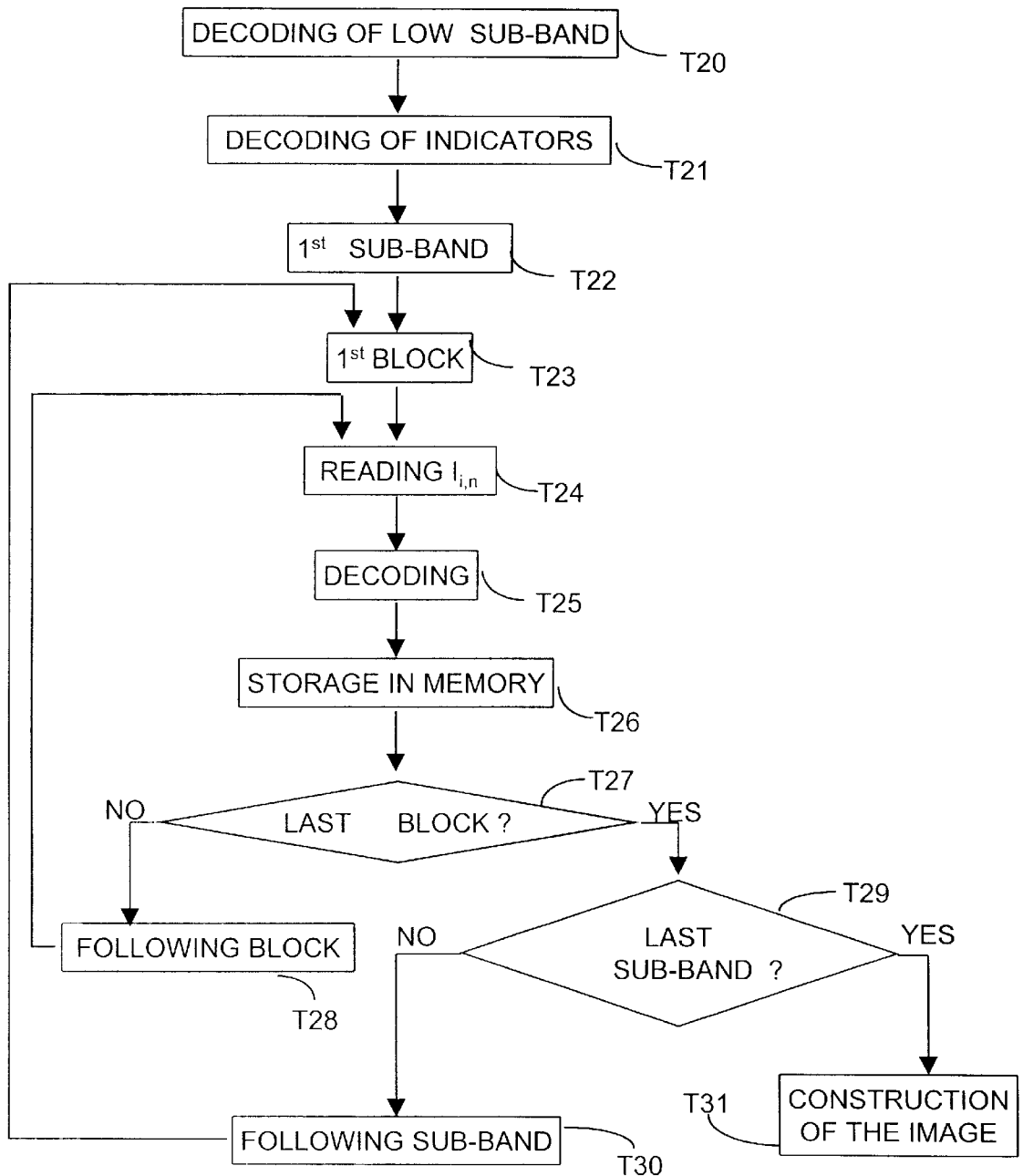
FIG. 18 is a digital signal decoding algorithm according to the second embodiment of the invention.

With reference to FIG. 18, a second embodiment of method of decoding an image IM, used in the second embodiment of decoding device, comprises steps T20 to T31.

Step T20 is the decoding of the low sub-band signal $LLC_3$ in order to form a decoded low sub-band signal $LLd_3$ which is stored to memory.

The following step T21 is the decoding of the indicators. As disclosed previously, the indicator words are decoded according to a Huffman decoding, for example. The decoded indicator words supply the indicator of each of the coded blocks. Thus, for a given block, the decoded indicator indicates which coding mode was used for coding the block under consideration.

The following step T22 is an initialisation for considering the first detail sub-band signal to be decoded.

Step T22 is followed by step T23, which is an initialisation for considering the first block to be decoded in the current sub-band signal. The sub-band signals are decoded in the same order as at coding, and the blocks in a given sub-band signal are decoded in the same order as at coding, although different orders are possible.

The following step T24 is the reading of the indicator $I_{i,n}$ for determining which coding mode was used for coding the current block.

Step T24 is followed by step T25, which is the decoding of the current block. For example, if the block was coded by setting to zero, the decoding consists of creating a block where all the coefficients are at the value zero. The size of the block created depends on the sub-band signal currently being decoded, and is for example determined by the index of the block. If the block was coded by scalar quantization, it is decoded. For this purpose, as stated above, the data coded by Huffman coding are read and decoded. The quantization indices corresponding to the coefficients of the block currently being decoded are extracted. The indices are dequantified in order to generate the coefficients of the decoded block $Bd_{i,n}$.

The decoded block $Bd_{i,n}$ is stored to memory at the following step T26.

Steps T27 and T29 are tests for verifying respectively whether all the blocks of a sub-band signal and all the sub-band signals have been decoded. If there remains at least one block to be decoded in the current sub-band signal, step T27 is followed by step T28 for considering the following block. Step T28 is followed by the previously described step T24.

If there remains at least one sub-band signal to be decoded, step T29 is followed by step T30 for considering the following sub-band signal. Step T30 is followed by the previously described step T23.

When all the sub-band signals have been decoded, that is to say when the response is positive at step T29, the latter step is followed by the step R31 of constructing the decoded image. The latter can then be displayed for example.

Figure 19:
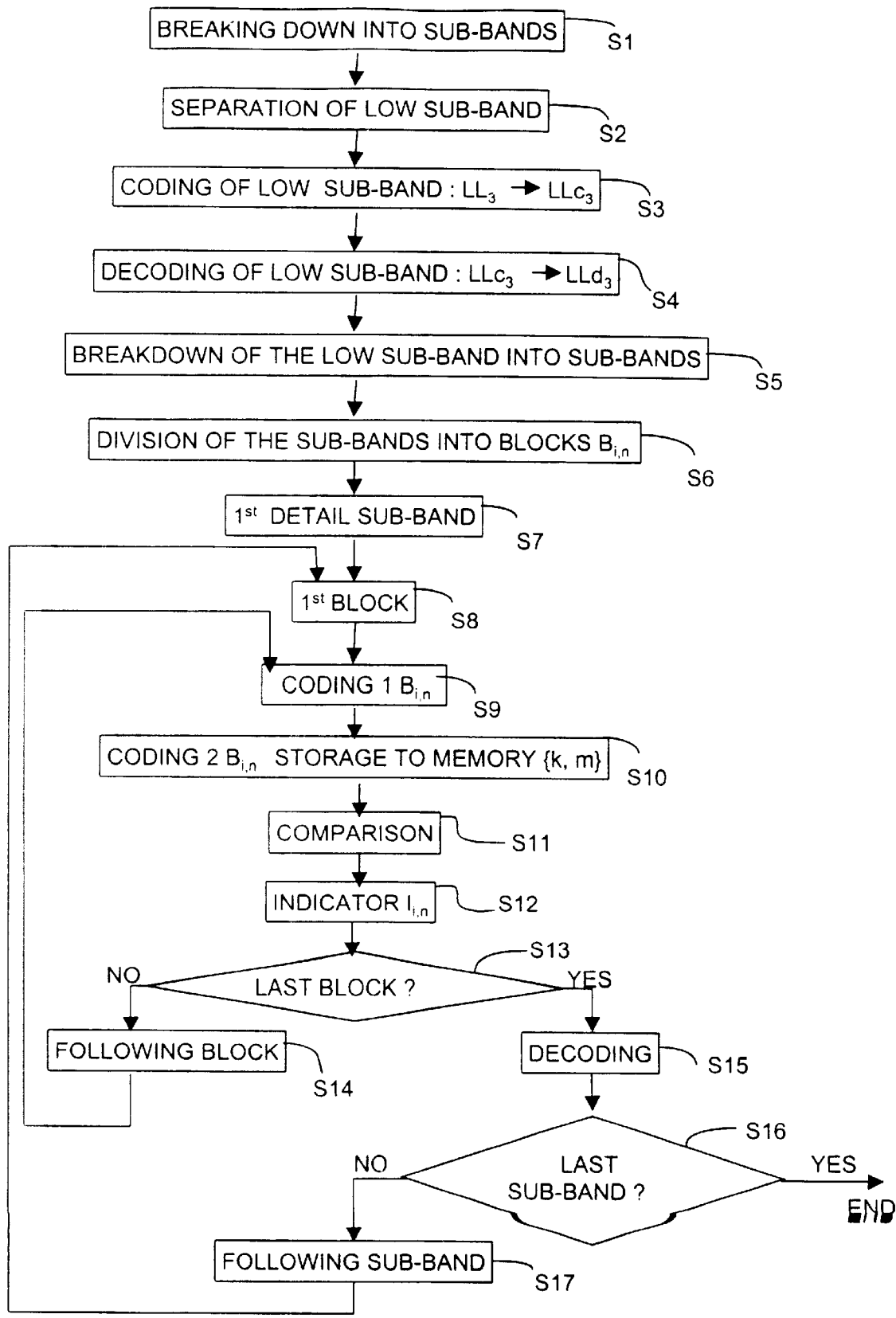
FIG. 19 is an algorithm for coding a digital signal according to the third embodiment of the invention.

With reference to FIG. 19, an third embodiment of a coding method is disclosed in particular. The method of coding an image IM, according to this embodiment of the invention, is implemented in the third embodiment of the coding device, includes steps S1 to S17.

The method includes overall the breakdown of the image into sub-band signals of different resolutions, and then the coding of the low sub-band signal separately. Each of the detail sub-band signals is then coded, according to the third coding mode, as a function of the sub-band signal of the same orientation and lower resolution. This embodiment is therefore based on a multi-resolution breakdown of the image to be coded.

This embodiment of the invention makes it possible to obtain a high ratio of compression to distortion.

This is because, according to the third coding mode, a determination is made first of all, for each block to be coded, of the source blocks in a sub-band signal of lower resolution, which have a sufficiently high energy to be able to code the block under consideration with precision.

A determination is next made, for each "candidate" source block, of a transformation such that the source block transformed by this transformation is a good approximation of the block to be coded.

Finally, a determination is made, from amongst all the pairs of "candidate" source blocks and transformations, which is the one which most precisely codes the target block.

The coding error, or distortion, is therefore low.

The coding data of a block are therefore the ranking of the source block and the index of the transformation which are used for coding it. These coding data require only a low transmission rate. The compression resulting from the coding is therefore high.

Overall, this embodiment improves the source block search and provides a compact code for describing the blocks coded according to the third coding mode.

Step S1 is the breakdown into sub-band signals of the image IM, as depicted in FIG. 7. Step S1 results in the sub-band signals $LL_3$, $HL_3$, $LH_3$ and $HH_3$ of lower resolution $RES_3$, the sub-band signals $LH_2$, $HL_2$, $HH_2$ of intermediate resolution $RES_2$, and the sub-band signals $LH_1$, $HL_1$ and $HH_1$ of higher resolution $RES_1$.

The low sub-band signal $LL_3$ is separated from the other sub-band signals at the following step S2.

Step S3 codes the low sub-band signal $LL_3$, for example using a DPCM (Differential Pulse Code Modulation) coding, and results in the coded sub-band signal $LLC_3$, which is stored and/or transmitted.

Step S3 is followed by step S4, which is the decoding of the sub-band signal $LLC_3$. A decoded sub-band signal $LLd_3$ is formed. The decoding mode depends on the coding mode used at the previous step.

At the following step S5, the decoded sub-band signal $LLd_3$ is broken down into sub-band signals of lower resolution $LL_4$, $HL_4$, $LH_4$ and $HH_4$. The sub-band signals $HL_4$, $LH_4$ and $HH_4$ are used for coding the sub-band signals $HL_3$, $LH_3$ and $HH_3$ of resolution $RES_3$.

Step S5 is followed by step S6, which is the division of the sub-band signals into blocks $B_{i,n}$, as depicted in FIG. 8.

The following step S7 is an initialisation for considering the first detail sub-band signal to be coded. The resolution levels are processed in increasing order. For each resolution level, the sub-band signals are taken into account in an order which is in principle any order, whilst being predetermined.

The following step S8 is an initialisation for considering the first block of the current sub-band signal. The blocks in the current sub-band signal are taken into account in any predetermined order.

Step S8 is followed by step S9, which is the coding, by setting to a predetermined value, here zero, of the coefficients of the current block $B_{i,n}$.

The following step S10 is the coding of the current block $B_{i,n}$. Step S10 is detailed hereinafter; it results in a coded form {k, m} of the current block, representing a source block $BS_k$ and a transformation $T_m$. The value of the coded form {k, m} of the current block is stored to memory at step S10.

The following step S11 is the comparison of the two coding modes, for the current block, according to a predetermined criterion. Step S11 results in the selection of one of the coding modes, for the current block $B_{i,n}$.

For this purpose, the sums $R_{1,i,n}+\lambda.D_{1,i,n}$ and $R_{2,i,n}+\lambda.D_{2,i,n}$ are calculated, where $R_{1,i,n}$ and $R_{2,i,n}$ are the transmission rates necessary for transmitting the current block coded by the two modes, $D_{1,i,n}$ and $D_{2,i,n}$ are the distortions caused in the current block by the two coding modes, and $\lambda$ is a coefficient for adjusting the compression/distortion ratio. As disclosed above, the errors $D_{1,i,n}$ and $D_{2,i,n}$ measure respectively the quadratic error brought into the reconstructed image by the coding of the block under consideration, according to the first and second coding modes. The coding for which the sum is the lowest is selected, for the current block.

At the following step S12, an indicator $I_{i,n}$ is associated with the current block in order to indicate which is the coding selected at step S11. The indicator $I_{i,n}$ is for example a bit which is set to zero if the block under consideration is coded by setting to zero, and which is set to one if the block under consideration is coded by the second coding mode.

Step S12 also includes the storage to memory of the value of the indicator $I_{i,n}$ as well as coded data in case where the current block is coded by the second coding mode.

Steps S13 and S16 are tests for checking, respectively, whether all the blocks of a sub-band signal have been coded, and whether all the sub-band signals have been coded. If there remains at least one block to be coded in the current sub-band signal, step S13 is followed by step S14 for considering the following block. Step S14 is followed by the previously described step S9.

When all the blocks of a sub-band signal have been coded, step S13 is followed by step S15, at which the blocks are decoded in order to form a decoded sub-band signal. The decoding of each of the blocks consists either of forming a block for which all the coefficients are nil, or seeking the source block of ranking k having an energy greater than the threshold SE and applying the transformation $T_m$ to the source block $BS_k$. A decoded sub-band signal is then used for coding the blocks of the sub-band signal of the same orientation and higher resolution.

If there remains at least one sub-band signal to be coded, step S16 is followed by step S17 for considering the following sub-band signal. Step S17 is followed by the previously described step S8.

Figure 20:
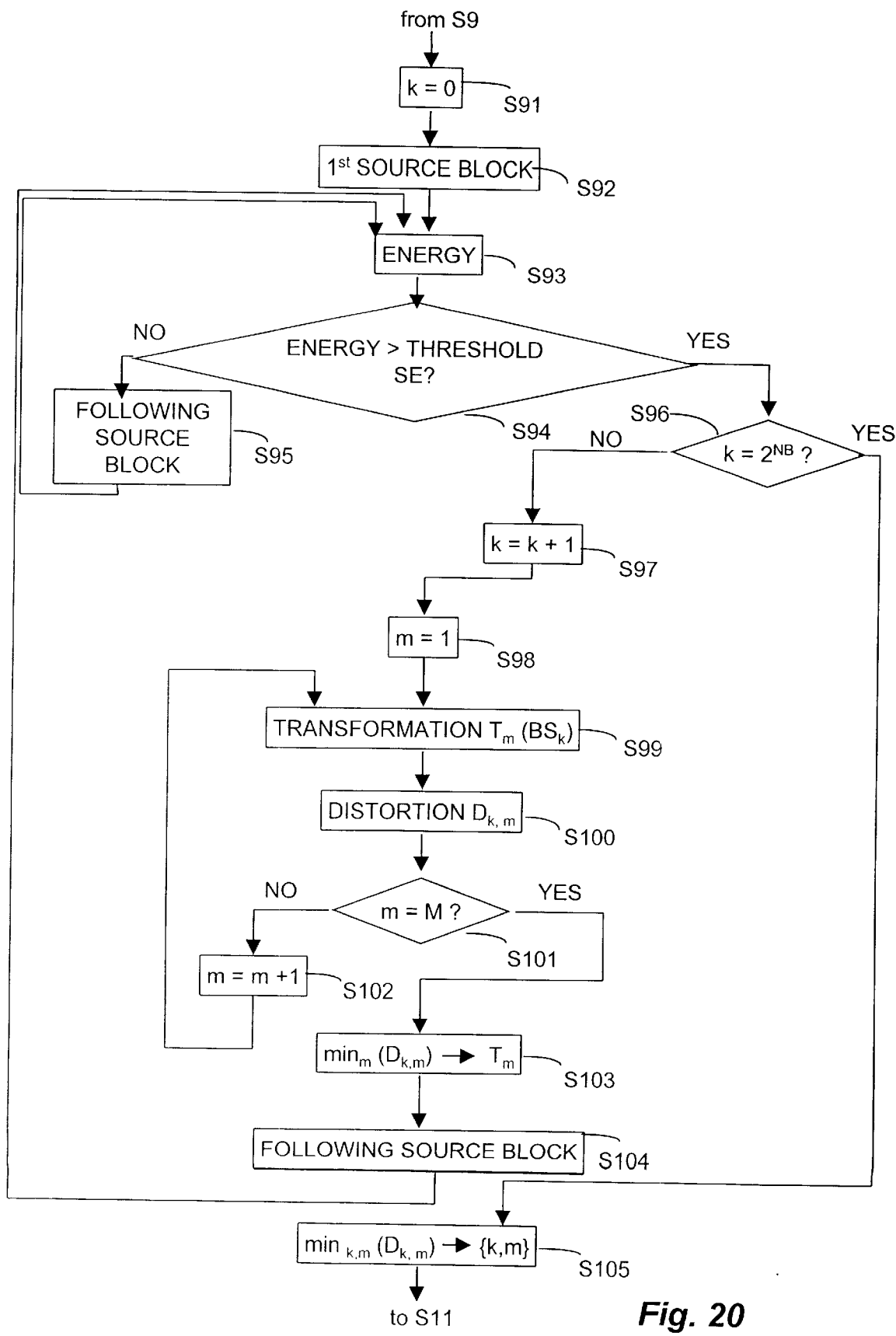
FIG. 20 is an algorithm for coding a block, included in the algorithm of FIG. 19.

The step S10 of coding a block of a detail sub-band signal, referred to as a target block, according to the third coding mode, is detailed in FIG. 20 and includes sub-steps S91 to S105.

The coding includes overall selecting a set of source blocks according to their energy, and then seeking, for each of the selected source blocks, a transformation, from amongst a predetermined set of transformations, which makes it possible to code the target block with the greatest precision. The coding includes finally comparing the selected source blocks, each associated with their transformation, in order to determine the pair which codes the target block with the greatest precision.

Step S91 is the initialisation of a variable k to zero. A variable k counts the source blocks selected for each block to be coded.

The following step S92 is the determination of the first source block in the sub-band signal of the same orientation and lower resolution. The first source block is the one which has the same location, except for the resolution factor, as the target block, each in their respective sub-band signal. This first source block is generally a good candidate for coding the target block.

The following step S93 is the calculation of the energy of the current source block. The energy is calculated in a conventional fashion, by the sum of the squares of the coefficients of the block.

Step S93 is followed by step S94, which is a test for determining whether the energy of the current source block is greater than a predetermined threshold SE. If the response is negative, the current source block is no longer taken into account and step S94 is followed by step S95, at which the following source block is considered. The order of the source blocks considered is such that these have a distance which is substantially increasing with respect to the first source block, for example they cover substantially a spiral centred on the first source block. The best source blocks for coding the target block are generally close to the first source block.

If at step S94 the energy of the source block under consideration is greater than the threshold SE, this step is followed by step S96, which is a test for determining whether the counter k has reached a predetermined limit value, for example equal to $2^{NB}$ where NB represents the number of bits available for coding the value of the counter k.

If the response is negative, step S96 is followed by step S97, at which the counter k is incremented by one unit. The source block selected is then referenced by its ranking k.

The following step S98 is the initialisation of a parameter m to the value one, for considering the first transformation $T_1$ of the predetermined set of transformations $\{T_1, \ldots, T_M\}$.

At the following step S99 the current transformation $T_m$ is applied to the current source block $BS_k$.

Step S99 is followed by step S100, at which the distortion $D_{k,m}$ in the current sub-band signal, created by applying the transformation $T_m$ to the current source block $BS_k$, is calculated. The distortion $D_{k,m}$ or coding error, measures the quadratic error brought into the reconstructed image by the coding of the block under consideration. Where the breakdown into sub-band signals is orthogonal, the error is equal to the quadratic error between the original block and the reconstructed block. This criterion is simple and rapid to implement, whilst giving good results.

The following step S101 is a test for determining whether the current transformation is the last of the set of transformations. If the response is negative, the parameter m is incremented by one unit at step S102 for considering the following transformation. Step S102 is followed by the previously described step S99.

When all the transformations $T_1$ to $T_M$ have been applied to the current source block, step S101 is followed by step S103, at which all the distortions $D_{k,m}$ previously calculated and relating to the current source block $BS_k$ are compared in order to determine which of them is the smallest. The transformation $T_m$ corresponding to the smallest distortion is associated with the current source block, itself referenced by its ranking k in the search.

The following source block is considered at step S104. This step is followed by step S93.

When at step S96 the counter k has reached the limit value, this means that the maximum number of selected source blocks has been reached; this step is followed by step S105, which determines which is the minimum distortion amongst the $2^{NB}$ distortions $D_{k,m}$ associated with the pairs of transformations and source blocks selected at step S103. This minimum distortion determines the source block and the associated transformation which constitute the coded form of the current block. This coded form consists of the pair $\{k, m\}$ and is stored to memory and/or transmitted.

Figure 21:
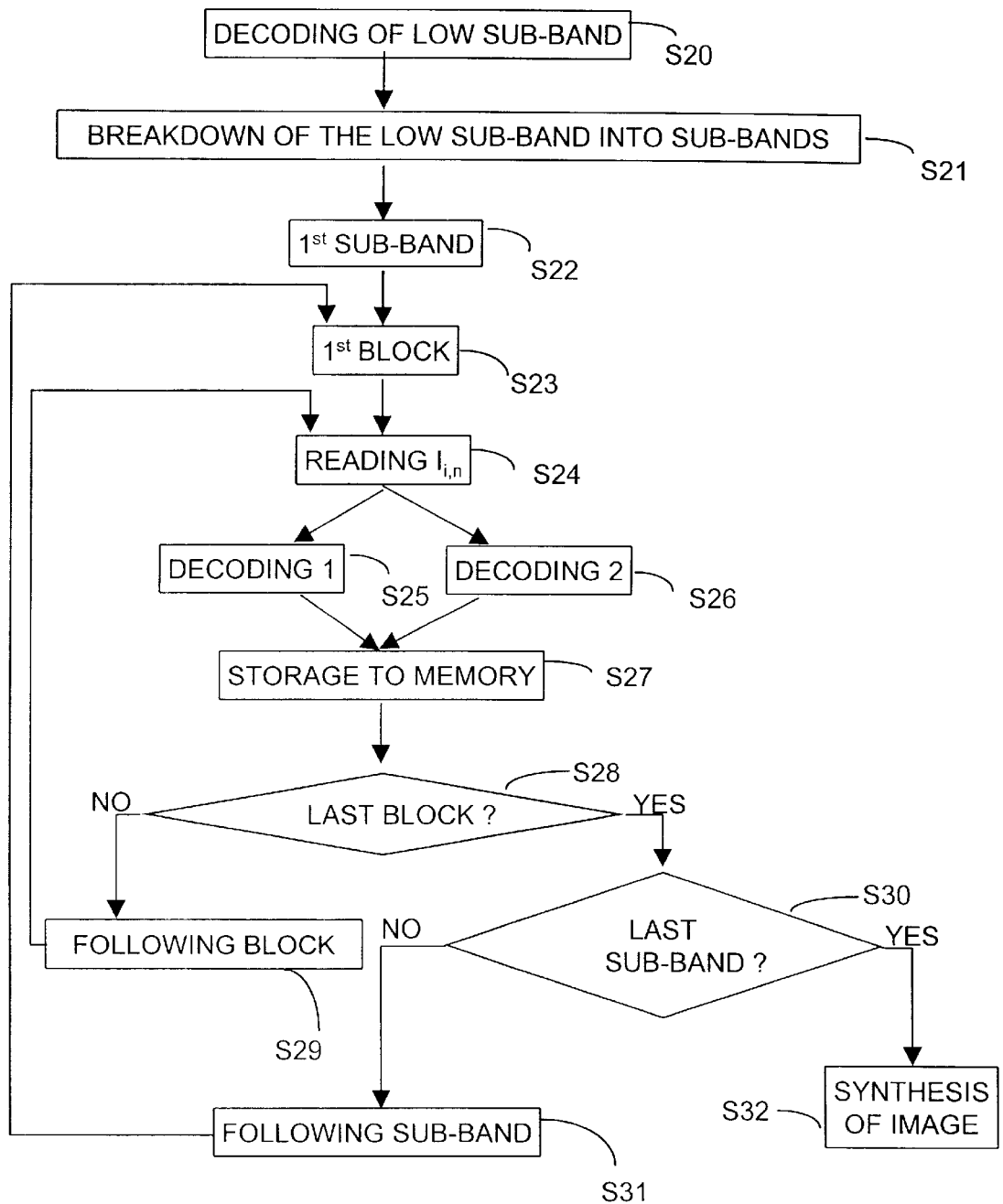
FIG. 21 is an algorithm for decoding a digital signal according the third embodiment of the invention.

With reference to FIG. 21, a method of decoding an image IM, according to the third embodiment of the invention, used in the third embodiment of the decoding device, comprises steps S20 to S32.

Step S20 is the decoding of the low sub-band signal $LLc_3$ in order to form a decoded low sub-band signal $LLd_3$, which is stored to memory.

The following step S21 is the breakdown of the decoded low sub-band signal $LLd_3$ into sub-band signals of lower resolution $LL_4$, $HL_4$, $LH_4$ and $HH_4$. The sub-band signals $HL_4$, $LH_4$ and $HH_4$ are used for decoding the sub-band signals $HL_3$, $LH_3$ and $HH_3$ of higher resolution $RES_3$.

The following step S22 is an initialisation for considering the first detail sub-band signal to be decoded. The first sub-band signal is of resolution $RES_3$.

Step S22 is followed by step S23, which is an initialisation for considering the first block to be decoded in the current sub-band signal. The sub-band signals are decoded in the same order as at coding, and the blocks in a given sub-band signal are decoded in the same order as at coding, although different orders are possible.

The following step S24 is the reading of the indicator $I_{i,n}$ for determining which coding mode was used for coding the current block.

If the block was coded by setting to zero, step S24 is followed by step S25, which is the decoding of the current block by creating a block $Bd_{i,n}$, all the coefficients of which are at the value zero. The size of the block created depends on the sub-band signal currently being decoded, and is for example determined by the index of the block.

If the block was coded by the second coding mode, step S24 is followed by step S26, which includes the reading of the coded form $\{k, m\}$ of the current block for determining which are the ranking of the source block and the coding mode which were used for coding the current block. Step S26 includes the decoding of the current block. This step is detailed hereinafter and results in a decoded block $Bd_{i,n}$.

The decoded block $Bd_{i,n}$ is stored to memory at the following step S27.

Steps S28 and S30 are tests for checking, respectively, whether all the blocks of a sub-band signal have been decoded, and if all the sub-band signals have been decoded. If there remains at least one block to be decoded in the current sub-band signal, step S28 is followed by step S29 for considering the following block. Step S29 is followed by the previously described step S24.

If there remains at least one sub-band signal to be decoded, step S30 is followed by step S31 for considering the following sub-band signal. Step S31 is followed by the previously described step S23.

When all the sub-band signals have been decoded, that is to say when the response is positive at step S30, the latter step is followed by the step S31 of synthesising the decoded image. The latter can then be displayed, for example.

Figure 22:
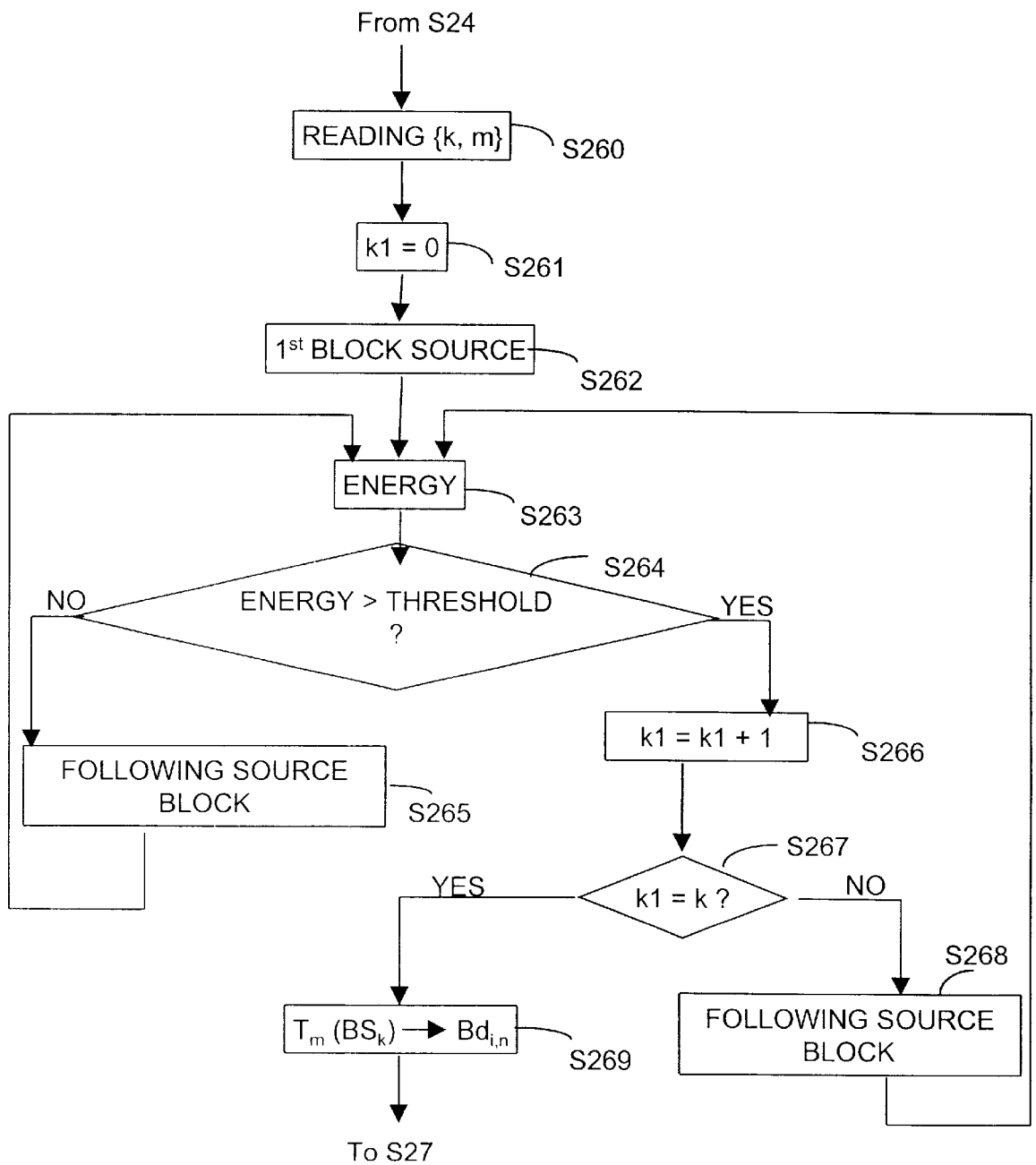
FIG. 22 is an algorithm for decoding a block, included in the algorithm of FIG. 21.

The step S26 of decoding a block of a detail sub-band signal includes sub-steps S260 to S269 and is described with reference to FIG. 22.

Step S260 is the reading of the coded form $\{k, m\}$ of the current block for determining which are the ranking of the source block and the coding mode which were used for coding the current block.

The following step S261 is an initialisation of a parameter k1 to zero.

At the following step S262, the first source block is considered. The first source block is situated in the decoded sub-band signal of the same orientation and lower resolution with respect to the sub-band signal of the current block.

The following step S263 is the calculation of the energy of the current source block.

Step S263 is followed by step S264, which is a test for determining whether the energy of the current source block is greater than the predetermined threshold SE. If the response is negative, the current source block is no longer taken into account and step S264 is followed by step S265, at which the current source block is considered. Step S265 is followed by step S263.

If at step S264 the energy of the current source block is greater than the threshold SE, this step is followed by step S266, at which the parameter k1 is incremented by one unit.

The following step S267 is a test for determining whether the parameter k1 is equal to the ranking k. If the response is negative, this step is followed by step S268 for considering the following source block. Step S268 is followed by step S263.

When at step S267 the parameter k1 is equal to the value k, the source block $BS_k$ which was used to code the current block has been found. The transformation $T_m$ is then applied to the source block at step S269, which forms the decoded block $Bd_{i,n}$.

Figure 23:
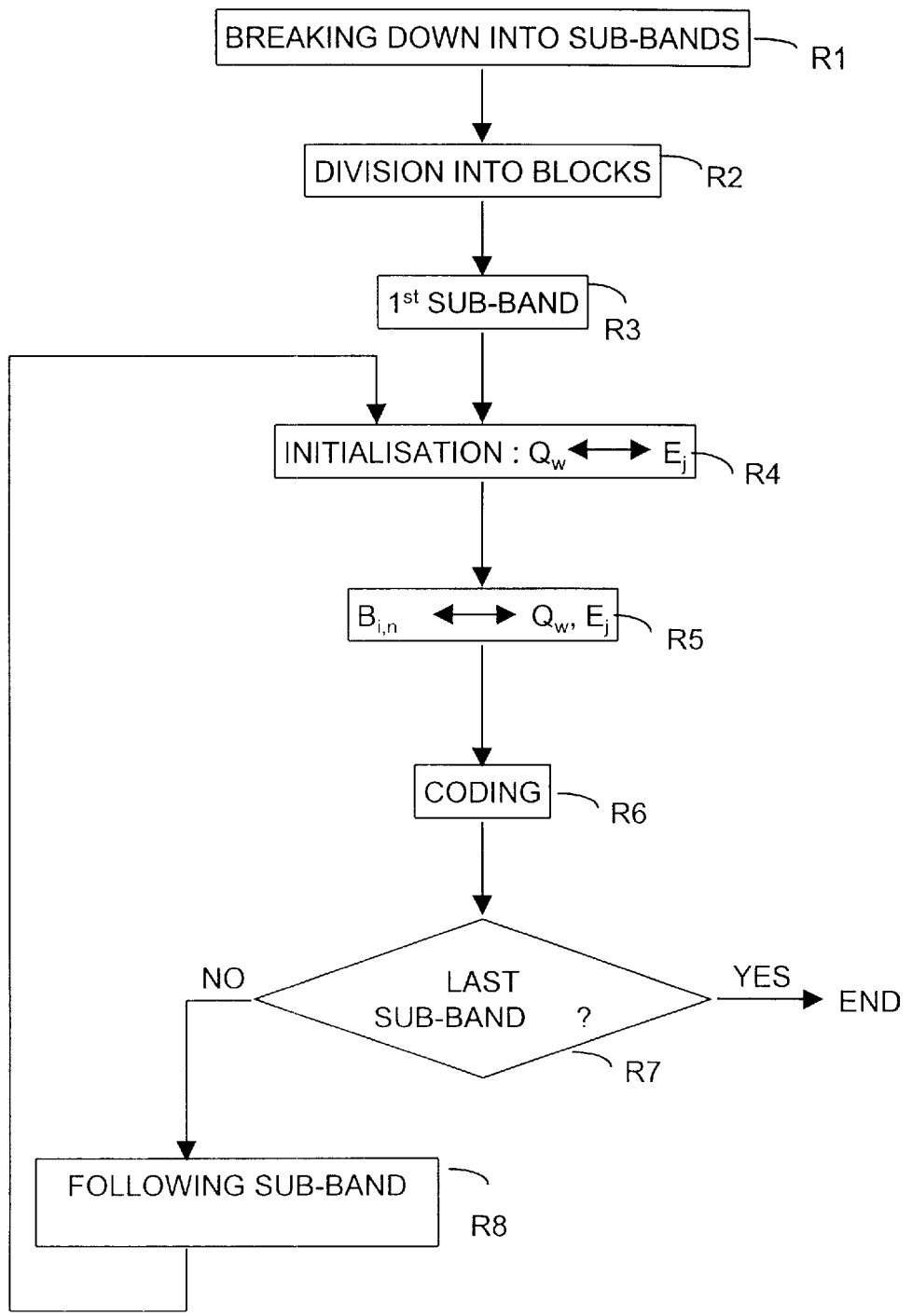
FIG. 23 is an algorithm for coding a digital signal according to the fourth embodiment of the invention.

With reference to FIG. 23, a fourth embodiment of method of coding an image IM, used in the fourth embodiment of the coding device, includes steps R1 to R8.

Hereinafter, it is considered that the coding of a digital signal includes two main operations: the quantization of the signal, for example a vectorial quantization, which supplies a series of symbols, and then an entropic coding of these symbols, for example a Huffman coding, which supplies a binary series.

In this context, coding by setting to a predetermined value is a special case in which the binary series is of nil length.

The coding method uses a predetermined number $Q_w$ of quantifiers and a predetermined number $E_j$ of entropic coders.

This embodiment of the invention gives a high ratio of compression to distortion.

This is because this embodiment makes it possible to allocate a quantization mode and an entropic coding mode to each of the blocks of the signal, which are well suited to coding this block and consequently which code it with precision.

Step R1 is the breaking down of the image IM into sub-band signals, as depicted in FIG. 7. Step R1 results in the sub-band signals $LL_3$, $HL_3$, $LH_3$ and $HH_3$ of lowest resolution $RES_3$, the sub-band signals $LH_2$, $HL_2$, $HH_2$ of intermediate resolution $RES_2$, and the sub-band signals $LH_1$, $HL_1$ and $HH_1$ of highest resolution $RES_1$.

In this embodiment, the lowest sub-band signal is coded like the detail sub-band signals. As a variant, it can be coded separately.

Step R1 is followed by step R2, which is the division of the sub-band signals into blocks $B_{i,n}$.

The following step R3 is an initialisation for considering the first sub-band signal. The sub-band signals are taken into account in an order which can in principle be any order, whilst being predetermined. Each sub-band signal is processed independently of the other sub-band signals.

The following step R4 is an initialisation for associating an entropic coder $E_j$ which each of the quantifiers $Q_w$. This step results in pairs $\{Q_w, E_j\}$, which are adapted to the sub-band signal currently being processed, as a function of a criterion. This step is described in detail hereinafter. It makes it possible to arrive at convergence, which will be disclosed later, with a reduced number of iterations. According to a simplified embodiment, this step is replaced by an association effected a priori, whatever the signal to be coded.

Step R4 is followed by step R5, which is the determination, for each of the blocks of the sub-band signal currently being processed, of the quantifier $Q_w$ and of the entropic coder $E_j$ which are the most suited to it, according to a criterion. This step is detailed hereinafter.

The following step R6 is the coding proper of each of the blocks of the sub-band signal currently being processed. For a given block $B_{i,n}$, the coding consists of effecting the quantization of the block under consideration by the quantifier $Q_w$, in order to form a series of symbols which is transformed into a binary series by the entropic coder $E_j$.

An indicator $I_{i,n}$ is associated with each of the blocks for indicating which are the quantifier $Q_w$ and entropic coder $E_j$ which are used for coding the block under consideration. The indicator $I_{i,n}$ is for example a word whose value represents the selected coding $\{Q_w, E_j\}$. The indicator is then used for decoding the block under consideration.

The following step R7 is a test for determining whether all the sub-band signals have been processed. If there remains at least one sub-band signal to be processed, step R7 is followed by step R8 for considering the following sub-band signal. Step R8 is followed by the previously described step R4.

Figure 24:
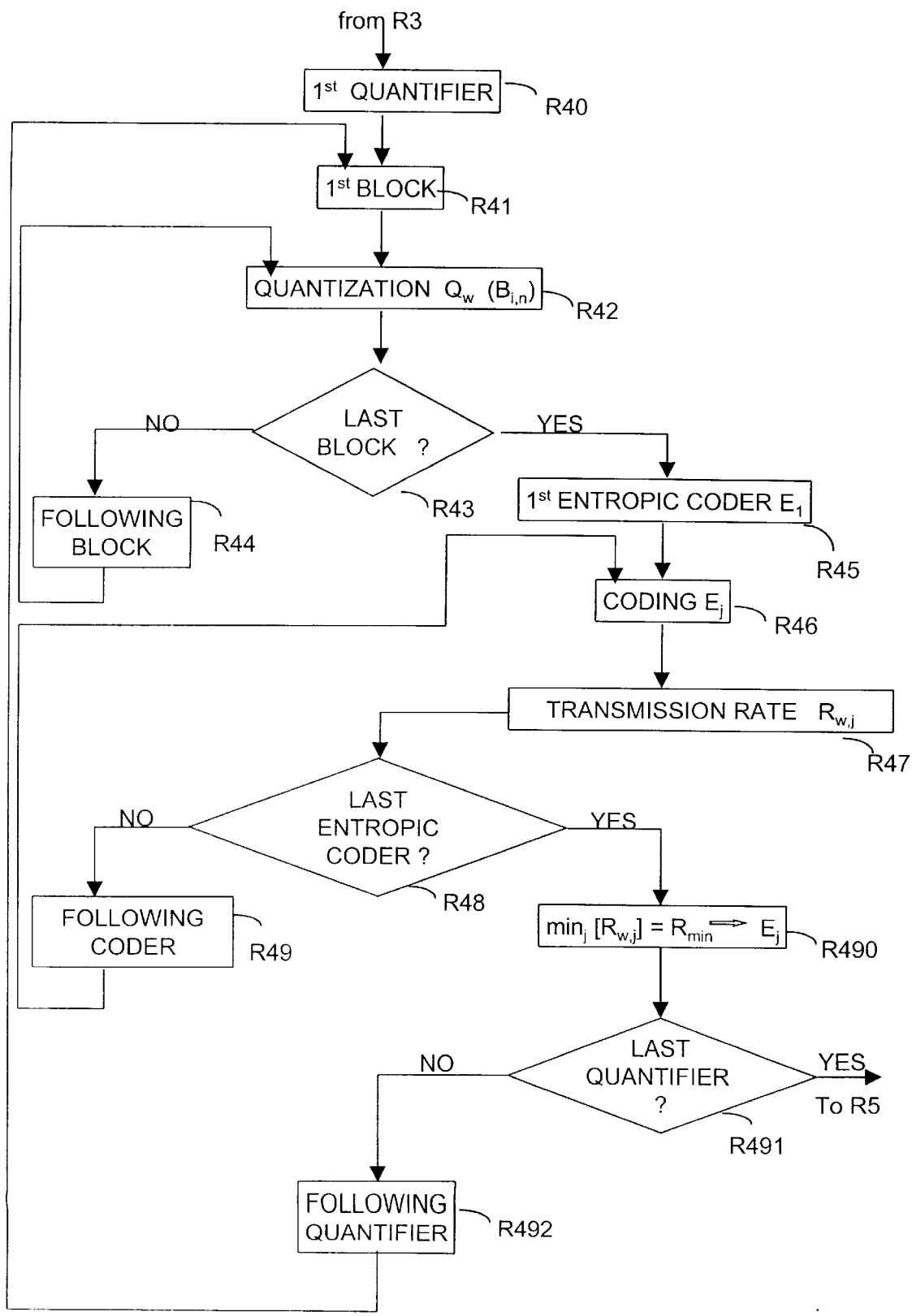
FIG. 24 is an initialisation algorithm included in the algorithm of FIG. 23.

The initialisation step R4 is detailed in FIG. 24 and includes sub-steps R40 to R492.

Here any sub-band signal of the digital image, the set of quantifiers $\{Q_w\}$ and the set of entropic coders $\{E_j\}$ are considered.

The step R40 is an initialisation for considering the first quantization $Q_1$. This step is followed by step R41 for considering the first block to be coded in the sub-band signal under consideration.

The following step R42 is the quantization of the block under consideration by the quantifier under consideration $Q_w$. This step results in a series of symbols which are stored to memory.

Step R42 is followed by step R43, which is a test for determining whether the block under consideration is the last in the sub-band signal currently being processed. If the response is negative, step R43 is followed by step R44 for considering the following block in the sub-band signal. The blocks are considered in any predetermined order. Step R44 is followed by the previously described step R42.

When all the blocks of the sub-band signal have been quantified, step R43 is followed by step R45 for considering the first entropic coder $E_1$.

The following step R46 is the coding, by means of the current entropic coder $E_j$, of the previously quantified blocks.

Step R46 is followed by step R47, at which the transmission rate $R_{w,j}$ of the coded sub-band signal is calculated and stored to memory. This transmission rate is equal to the sum of the transmission rates of all the coded blocks of the sub-band signal under consideration.

The following step E48 is a test for determining whether all the entropic coders have been used. If the response is negative, step R48 is followed by step E49 for considering the following entropic coder. Step R49 is followed by the previously described step R46.

When all the entropic coders have been used, step R48 is followed by step R490, at which there is determined, relative to the quantifier $Q_w$, the minimum of the transmission rates calculated when passing through step R47, that is to say for each of the entropic coders. The minimum transmission rate $R_{min}$ corresponds to an entropic coder $R_j$, which is associated with the quantifier under consideration $Q_w$. This criterion participates in the obtaining of a good ratio of compression to distortion.

The following step R491 is a test for determining whether all the quantifiers have been processed. If the response is negative, step R491 is followed by step R492 for considering the following quantifier. The quantifiers are taken in any predetermined order. Step R492 is followed by the previously described step R41.

When all the quantifiers have been processed, step R491 is followed by step R5.

Step R4 thus results in associating an entropic coder $E_j$ with each of the quantifiers $Q_w$, using a criterion of minimum transmission rate for transmitting the coded digital signal, in this case a coded sub-band signal.

Figure 25:
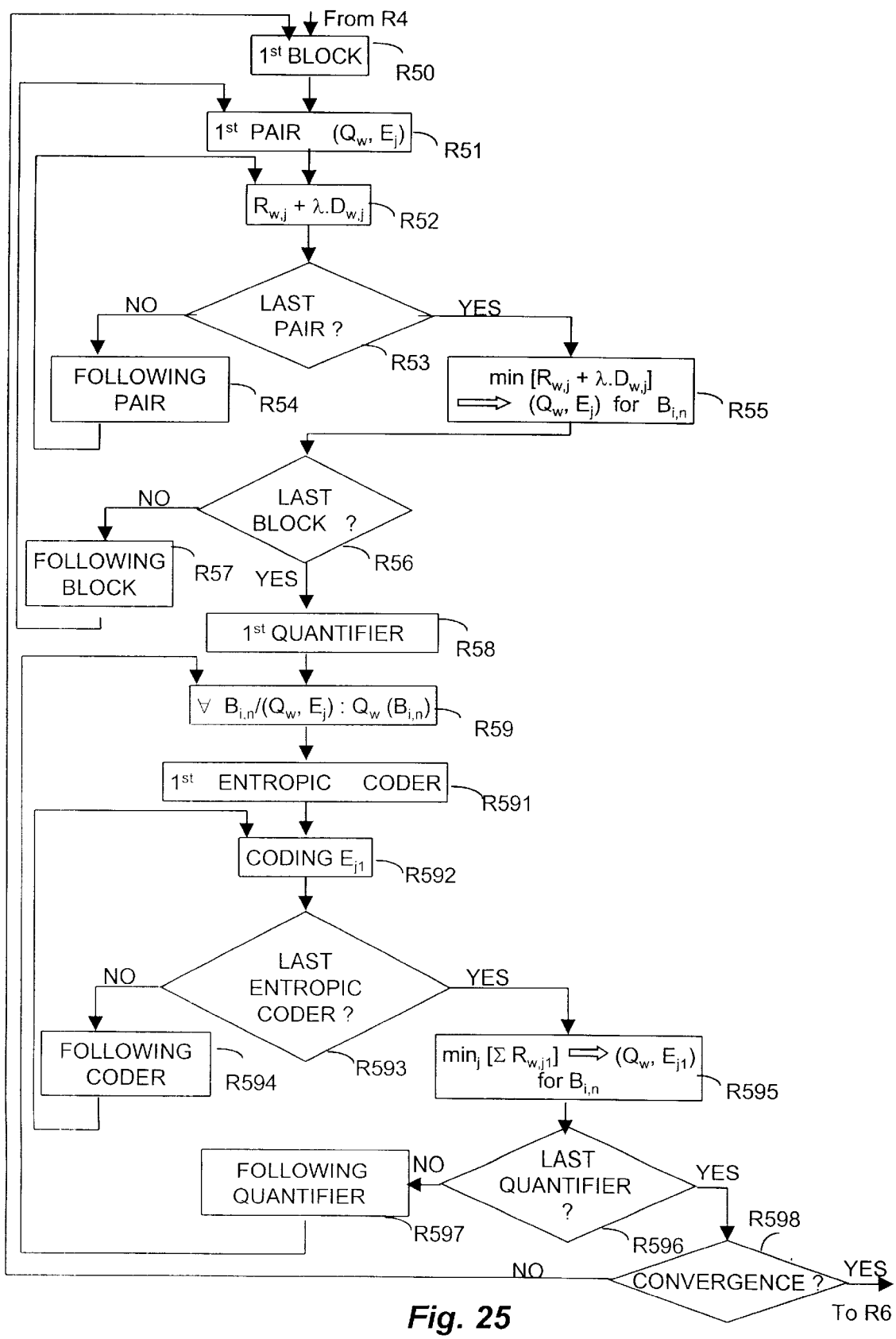
FIG. 25 is an algorithm for determining quantization modes and entropic coding modes, included in the algorithm of FIG. 23.

Step R5 is detailed in FIG. 25 and includes sub-steps R50 to R598.

Step R50 is an initialisation for considering the first block of the sub-band signal currently being processed.

The following step R51 is an initialisation for considering the first quantifier and entropic coder pair $(Q_w, E_j)$, from amongst the pairs formed at step R4. The pairs are considered in any predetermined order.

The following step R52 is the calculation and storage to memory of the sum $R_{w,j} + \lambda.D_{w,j}$, where $R_{w,j}$ is the transmission rate necessary for transmitting the current block $B_{i,n}$ coded by the pair $(Q_w, E_j)$, $D_{w,j}$ is the error or distortion caused in the current block by the coding, and $\lambda$ is a coefficient for adjusting the compression/distortion ratio.

The coefficient $\lambda$ varies from zero to infinity. For practical reasons, the sum $(1-\lambda).R_{w,j} + \lambda.D_{w,j}$ can be used in an equivalent fashion, with the coefficient $\lambda$ varying between zero and one.

The error $D_{w,j}$ measures the quadratic error brought into the reconstructed image by the coding of the block under consideration. Where the breakdown into sub-band signals is orthogonal, the error $D_{w,j}$ is equal to the quadratic error between the original block and the reconstructed block. In the case of a biorthogonal transform, the error $D_{w,j}$ is close to the quadratic error between the original block and the reconstructed block, so that it is possible to estimate the error by means of this quantity.

The following step R53 is a test for determining whether all the pairs of quantifiers and entropic coders have been used. If the response is negative, step R53 is followed by step R54, at which the following pair is considered. Step R54 is followed by the previously described step R52.

When all the pairs of quantifiers and entropic coders have been considered, step R53 is followed by step R55, at which the minimum of the sums calculated when passing through the step R52 is determined. This minimum corresponds to one of the pairs of quantifiers and entropic coders $(Q_w, E_j)$, which is then allocated to the block under consideration $B_{i,n}$. The purpose of this selection criterion is to obtain a good ratio of compression to distortion.

Step R55 is followed by step R56, which is a test for determining whether all the blocks of the sub-band signal under consideration have been processed. If the response is negative, step R56 is followed by step R57 for considering the following block. Step R57 is followed by the previously described step R51.

Steps R50 to R57 thus result in allocating a quantifier and an entropic coder to each of the blocks of the sub-band signal under consideration.

When all the blocks of the sub-band signal have been processed, step R56 is followed by step R58, at which the first quantifier is considered.

At the following step R59, all the blocks to which the current quantifier $Q_w$ (step R55) has been allocated are quantified by the quantifier $Q_w$. These blocks form a sub-set of the sub-band signal under consideration. Step R59 is followed by step R591, at which the first entropic coder is considered.

The following step R592 is the coding of the blocks quantified at step R59 by the current entropic coder $E_{j1}$. The coding data of each of the blocks are stored to memory.

Step R592 is followed by step R593, which is a test for determining whether all the entropic coders have been used. If the response is negative, step R593 is followed by step R594 for considering the following entropic coder. Step R594 is followed by the previously described step R592.

When all the entropic coders have been used, step R593 is followed by step R595, at which the transmission rate of the coding data of the blocks of the sub-set under consideration is determined, by each of the entropic coders. The entropic coder $E_{j1}$, for which the transmission rate is minimum, is allocated to the blocks of the sub-set under consideration. A new pair $(Q_w, E_{j1})$ has therefore been allocated to the blocks of the sub-set under consideration, to which the pair $(Q_w, E_j)$ had previously been allocated at step R55.

Step R595 is followed by step R596, which is a test for determining whether all the quantifiers have been processed. If the response is negative, step R596 is followed by step R597 for considering the following quantifier. Step R597 is followed by the previously described step R592.

When all the quantifiers have been processed, step R596 is followed by step R598, which is a convergence test. This test consists of checking whether the same pairs of quantifiers and entropic coders are allocated to the same blocks, during several successive repetitions of steps R50 to R597. The number of repetitions is for example two. This convergence criterion is simple to implement, since it suffices to store to memory the sub-sets obtained at each iteration and to compare them with those stored at the previous iteration.

As long as the convergence test is not positive, step R598 is followed by step R50. When the convergence test is positive, step R598 is followed by step R6.

The decoding method according to this embodiment of the invention includes the steps of reading the value of the indicator $I_{i,n}$ of the blocks and of decoding and dequantifying the coded representations of the blocks, according to the value of the respective indicator.

Naturally, the present invention is in no way limited to the embodiments described and depicted, but quite the contrary encompasses any variant within the capability of persons skilled in the art.

For example, characteristics of the four described embodiments can be combined.

In particular, the invention can easily be applied to other types of signal.

These signals can be monodimensional signals such as sounds, or seismic readings, or again electrocardiograms; according to their nature, the signals are analysed according to time or spatial frequencies.

These signals can be three dimensional, such as video sequences represented according to two spatial frequencies and one time frequency. A breakdown into frequency sub-band signals in dimension three is then implemented, and the breakdown of the signal into vectors also takes place in dimension three.

For a signal having components in several frequency bands, such as a colour image signal having red, green and blue components, the invention applies in each of the frequency bands.

What is claimed is:

1. A digital signal coding device having an analyzer for analyzing a digital signal into a plurality of frequency sub-band signals distributed according to at least two different frequency bands, at least one first sub-band signal having a lower frequency and at least one second sub-band signal having a higher frequency, wherein the digital signal coding device comprises:
   a divider, arranged for dividing each second sub-band signal into blocks;
   a coding mode selector, arranged for selecting a coding mode for each block to be coded from amongst a predetermined set of coding modes, according to a selection criterion;

an indicator associator, arranged for associating an indicator with each block to be coded, the value of which is a function of the coding mode selected for the block under consideration;

an indicator grouper, arranged for grouping the indicators into indicator words, according to a grouping criterion; and an entropic encoder for entropic coding of the indicator words.

2. A digital signal coding device according to claim 1, wherein the device is adapted, for each block, to code the block by each coding mode, compare the coding modes according to the selection criterion and select the coding mode which satisfies the selection criterion.

3. A digital signal coding device according to claim 2, wherein the device is adapted, for each block to be coded, to select the coding mode which minimizes a sum of an addition of the transmission rate and a product of a predetermined coefficient multiplied by the coding error of the block under consideration.

4. A digital signal coding device according to claim 1, wherein the device is adapted to group together indicators of blocks selected from sub-band signals in order to correspond to the same part of the digital signal.

5. A digital signal coding device according to claim 1, wherein the device is adapted to implement a Huffman coding as an entropic coding of the indicator words.

6. A digital signal coding device according to claim 1, wherein the device is adapted to code the at least one first sub-band signal according to another coding mode.

7. A digital signal coding device according to claim 1, wherein the device is adapted to code the at least one first sub-band signal in an identical manner to the at least one second sub-band signal.

8. A digital signal coding device according to claim 1, wherein the divider, coding mode selector, indicator associator, indicator grouper, and entropic coder are incorporated in:

a microprocessor, a read-only memory containing a program for coding each of the data blocks, and a random access memory containing registers adapted to record variables modified during execution of the program.

* * * * *

UNITED STATES PATENT AND TRADEMARK OFFICE
CERTIFICATE OF CORRECTION

PATENT NO.  : 6,215,422 B1
DATED       : April 10, 2001
INVENTOR(S) : Felix Henry et al.

It is certified that error appears in the above-identified patent and that said Letters Patent is hereby corrected as shown below:

Drawing,
Sheet 15 of 23, FIG. 17, "SUS-BAND" should read -- SUB-BAND --; and
Sheet 21 of 23, FIG. 23, "INITIALISATION" should read -- INITIALIZATION --.

Column 7,
Line 20, "centred" should read -- centered --.

Column 9,
Lines 7 and 11, "initialisation" should read -- initialization --.

Column 10,
Line 11, "equipement" should read -- equipment --; and
Line 61, "initialisation" should read -- initialization --.

Column 17,
Line 62, "centred" should read -- centered --.

Column 19,
Line 47, "15," should read -- $15_1$ --.

Column 21,
Line 51, "CR-ROM." should read -- CD-ROM. --.

Column 22,
Lines 15 and 19, "initialisation" should read -- initialization --.

Column 23,
Line 4, "initialisation" should read -- initialization --; and
Line 6, "initialisa-" should read -- initializa- --.

Column 24,
Lines 44 and 48, "initialisation" should read -- initialization --.

Column 26,
Line 6, "initialisation" should read -- initialization --; and
Line 8, initialisa-" should read -- initializa --.

Column 27,
Lines 28 and 43, "initialisation" should read -- initialization --.

UNITED STATES PATENT AND TRADEMARK OFFICE
CERTIFICATE OF CORRECTION

PATENT NO. : 6,215,422 B1
DATED : April 10, 2001
INVENTOR(S) : Felix Henry et al.

It is certified that error appears in the above-identified patent and that said Letters Patent is hereby corrected as shown below:

Column 28,
Line 47, "initialisation" should read -- initialization --.

Column 29,
Line 3, "centred" should read -- centered --; and
Line 16, "initialisation" should read -- initialization --.

Column 30,
Lines 3 and 50, "initialisation" should read -- initialization --; and
Line 6, "initialisa-" should read -- initializa- --.

Column 31,
Lines 43 and 48, "initialisation" should read -- initialization --.

Column 32,
Lines 13 and 18, "initialisation" should read -- initialization --.

Column 33,
Lines 5 and 7, "initialisation" should read -- initialization --.

Signed and Sealed this

Fifth Day of March, 2002

*Attest:*

JAMES E. ROGAN
*Attesting Officer*    *Director of the United States Patent and Trademark Office*